US012783494B2

(12) United States Patent
St. Martin et al.

(10) Patent No.: US 12,783,494 B2
(45) Date of Patent: Nov. 3, 2026

(54) SYSTEMS AND METHODS OF AGGREGATING DATA TO CREATE VIRTUAL MEMORIALS

(71) Applicant: Invisible Holdings LLC, Sheridan, WY (US)

(72) Inventors: Raymond Francis St. Martin, Felton, CA (US); Andrew Lee Van Valer, Reno, NV (US)

(73) Assignee: INVISIBLE HOLDINGS LLC, Sheridan, WY (US)

(*) Notice: Subject to any disclaimer, the term of this patent is extended or adjusted under 35 U.S.C. 154(b) by 0 days.

(21) Appl. No.: 18/979,316

(22) Filed: Dec. 12, 2024

(65) Prior Publication Data

US 2025/0200020 A1 Jun. 19, 2025

Related U.S. Application Data

(60) Provisional application No. 63/609,606, filed on Dec. 13, 2023.

(51) Int. Cl.
*G06F 16/22* (2019.01)
*G06F 16/2458* (2019.01)
*G06F 16/28* (2019.01)

(52) U.S. Cl.
CPC ...... *G06F 16/2282* (2019.01); *G06F 16/2477* (2019.01); *G06F 16/287* (2019.01)

(58) Field of Classification Search
CPC .................................................. G06F 16/2282
USPC .......................................................... 707/741
See application file for complete search history.

(56) References Cited

U.S. PATENT DOCUMENTS

| | | | | |
|---|---|---|---|---|
| 10,594,831 | B2 | 3/2020 | St. Martin et al. | |
| 10,606,872 | B1 * | 3/2020 | Shelton | G06F 16/3328 |
| 11,809,383 | B2 | 11/2023 | St. Martin et al. | |
| 12,147,455 | B2 | 11/2024 | St. Martin et al. | |
| 12,147,456 | B2 | 11/2024 | St. Martin et al. | |
| 2015/0006712 | A1 * | 1/2015 | Khann | H04L 67/52<br>709/224 |
| 2019/0287660 | A1 * | 9/2019 | Oliveira | G16H 40/63 |
| 2020/0394184 | A1 * | 12/2020 | Öz | G06F 9/451 |
| 2021/0004716 | A1 * | 1/2021 | Song | G06N 20/00 |
| 2024/0346057 | A1 * | 10/2024 | Vemulapalli | G06F 16/909 |
| 2025/0045254 | A1 | 2/2025 | St. Martin et al. | |

OTHER PUBLICATIONS

U.S. Appl. No. 19/272,924, filed Jul. 17, 2025 (pending, not yet published) entitled "Social Identity and Value of Objects", Continuation-in-Part of U.S. Application No. 18/924,128, filed Oct. 23, 2024.

* cited by examiner

Primary Examiner — Muluemebet Gurmu
(74) *Attorney, Agent, or Firm* — Polsinelli LLP

(57) ABSTRACT

A plurality of data points is stored in a data structure. The plurality of data points is associated with a plurality of aspects of a subject. A query associated with the subject is received. The data structure is filtered to retrieve the plurality of data points associated with the time period. An arrangement of the plurality of data points along a timeline associated with the time period is outputted.

20 Claims, 14 Drawing Sheets

SOURCE DATABASE

| Source ID | Source Quality Score | Attributed Stories | Attributed Objects |
|---|---|---|---|
| 1684 | 162 | 41 | 249 |
| 276 | 193 | 28 | 174 |
| 2241 | 96 | 37 | 219 |
| 891 | 102 | 3 | 17 |
| 1095 | 135 | 8 | 194 |
| 594 | 85 | 22 | 291 |

FIG. 2

EVENT DATABASE

| Event ID | Event Description | Event Date |
|---|---|---|
| 12345 | Alex Bell's Birthday | 5/8/1940 |
| 35263 | Timmy's Birthday | 10/11/2008 |
| 73474 | Henry's Wedding | 9/9/1998 |
| 65323 | Jason Son's Birthday | 6/12/2021 |
| 17371 | Maya's Death | 10/2/1993 |
| 93863 | Xianoa's Hire Date | 13/05/2007 |

FIG. 3

LOCATION DATABASE

| Location ID | Location Description | GPS Coordinates |
|---|---|---|
| 36536 | Paris, France | 48.8566°N, 2.3522°E |
| 48267 | London, England | 48.8566°N, 2.3522°E |
| 47055 | Moscow, Russia | 48.8566°N, 2.3522°E |
| 7521 | Washington DC, USA | 48.8566°N, 2.3522°E |
| 46447 | McMurdo Station, Antarctica | 48.8566°N, 2.3522°E |
| 48510 | Toronto, Canada | 48.8566°N, 2.3522°E |
| 64533 | Normandy France | 48.8566°N, 2.3522°E |

FIG. 4

SUBJECT DATABASE

| Subject ID | Source ID | Subject Description |
|---|---|---|
| 12345 | 46862 | Alex Bell, Army Veteran, 22nd Marine Corps |
| 3 | 98732 | Timmy Collins, English Labrador, 5 years old |
| 79122 | 32323 | Riambs Corporation Private Ltd., Full Service Law firm |
| 38283 | 74387 | Stacy San, High School Teacher, Physics and Mathematics |
| 9339 | 73929 | Xianoa, An International Bank, Based in Sweden |
| 73729 | 47373 | Alumina Rock Band, 5 members, Heavy Metal |

FIG. 5

MEMORIAL DATABASE

| Subject ID | Subject Details | Location of Memorial | Time of Memorial | Display Conditions |
|---|---|---|---|---|
| 12345 | Alex Bell | 46.38720 °N, 4.320100 °E | August 5th | Birthday |
| 9 | Stan Blaze | 49.31605 °N, 88.32505 °E | September 21st | Wedding Anniversary |
| 76479 | Timmy Collins | 33.56235 °N, 97.68402 °E | November 10th | Birthday |
| 47642 | Jimmy Cook | 51.56219 °N, 91.13045 °E | November 17th | Graduation |
| 92468 | Henry House | 48.54888 °N, 53.89463 °E | January 11th | Foundation Day |
| 54467 | Sam Street | 46.24413 °N, 39.83455 °E | July 22nd | Wedding Anniversary |

FIG. 6

SYSTEMS AND METHODS OF AGGREGATING DATA TO CREATE VIRTUAL MEMORIALS

CROSS-REFERENCE TO RELATED APPLICATIONS

The present application claims the priority benefit of U.S. Provisional Patent Application No. 63/609,606, filed on Dec. 13, 2023, entitled "SYSTEMS AND METHODS OF AGGREGATING DATA TO CREATE VIRTUAL MEMORIALS," the disclosures of which is all incorporated herein by reference in its entirety.

FIELD OF THE DISCLOSURE

The present disclosure is generally related to generating and/or searching through an arrangement of data points associated with a subject to memorialize a time period associated with the subject, and more particularly relating to generating and/or searching through an arrangement of data points memorializing a person, an object, a location, an event, or another type of subject based on connections between the various data points, such as connections related to data sources and/or types.

BACKGROUND

There are countless personal accounts, images, transcriptions, audio, and video recordings describing or capturing historical events, objects, people, etc. spread across the globe. Some exist in archives, many exist in private collections—including vaults, cameras, hard drives, cloud storage services, PDAs—and many more are, as of yet, undiscovered. When researching for a person, animal or species, place, event, or thing from the past or the present, it is near impossible to aggregate and reconcile the different versions of history. Each story or account has its own perspective, attribution, interpretation, sourced materials, and as the number of varying accounts increase, each account becomes more suspect in its perceived accuracy.

As much as a truth founded in facts is important, it is often desirable to create a memorial from the perspective of a particular person or a group of people. Such perspective can add meaning to actions and may justify decisions which may otherwise seem whimsical or foolhardy. It may also find truth in accounts which may be objectively false but were believed to be true by the author of the account. The ability to memorialize stories with historical importance may be of importance to researchers, policymakers, or simply individuals seeking to remember deceased family or friends.

Memorials frequently take the form of physical tributes such as grave markers, specific coordinates which may be, for example, physical, virtual, or metaphysical in nature, or small shrines, often erected in a place important to the person or at the location they died. Such memorials typically require regular maintenance to maintain their appearance and can sometimes be considered an eye sore to people not involved, particularly when erected on property without authorization. Memorials may lack personalization, and as a result, many share distinct similarities. This is often due to a limited selection of materials and/or lack of funds to provide desired customizations to the memorials. This is particularly true for physical memorials, but can also apply to digital forms of memorials, such as website obituaries and remembrance pages which have become increasingly popular. While these websites may allow people to leave comments which may include stories of remembrance, they typically are viewable to everyone which may discourage documentation of personal experiences.

Therefore, there is a need for an affordable method of providing personalized memorials and remembrances specific to an individual's shared experiences without requiring a physical memorial which might require maintenance, or may be damaged, stolen, or destroyed impacting its longevity.

SUMMARY

Examples of the present technology include a method, a system, and a non-transitory computer-readable storage medium for or generating an arrangement memorializing a time period associated with a subject. A plurality of data points is stored in a data structure. The plurality of data points is associated with a plurality of aspects of a subject. A query associated with the subject is received. The data structure is filtered to retrieve the plurality of data points associated with the time period. An arrangement of the plurality of data points along a timeline associated with the time period is outputted.

In some examples, a method for generating an arrangement memorializing a time period associated with a subject includes storing a plurality of data points in a data structure. The plurality of data points is associated with a plurality of aspects of the subject. The method includes receiving a query associated with the subject. The method includes filtering the data structure to retrieve the plurality of data points associated with the time period. The method includes outputting an arrangement of the plurality of data points along a timeline associated with the time period.

In some examples, a system for generating an arrangement memorializing a time period associated with a subject includes a memory and a processor that executes instructions in memory. Execution of the instructions by the processor causes the processor to perform operations. The operations include storing a plurality of data points in a data structure. The plurality of data points is associated with a plurality of aspects of the subject. The operations include receiving a query associated with the subject. The operations include filtering the data structure to retrieve the plurality of data points associated with the time period. The operations include outputting an arrangement of the plurality of data points along a timeline associated with the time period.

In some examples, a non-transitory computer-readable storage medium has a program executable by a processor to perform a method for generating an arrangement memorializing a time period associated with a subject. The method includes storing a plurality of data points in a data structure. The plurality of data points is associated with a plurality of aspects of the subject. The method includes receiving a query associated with the subject. The method includes filtering the data structure to retrieve the plurality of data points associated with the time period. The method includes outputting an arrangement of the plurality of data points along a timeline associated with the time period.

BRIEF DESCRIPTION OF THE DRAWINGS

FIG. 2 illustrates an exemplary source database.

FIG. 3 illustrates an exemplary event database.

FIG. 4 illustrates an exemplary location database.

FIG. 5 illustrates an exemplary subject database.

FIG. 6 illustrates an exemplary memorial database.

DETAILED DESCRIPTION

Figure 1:
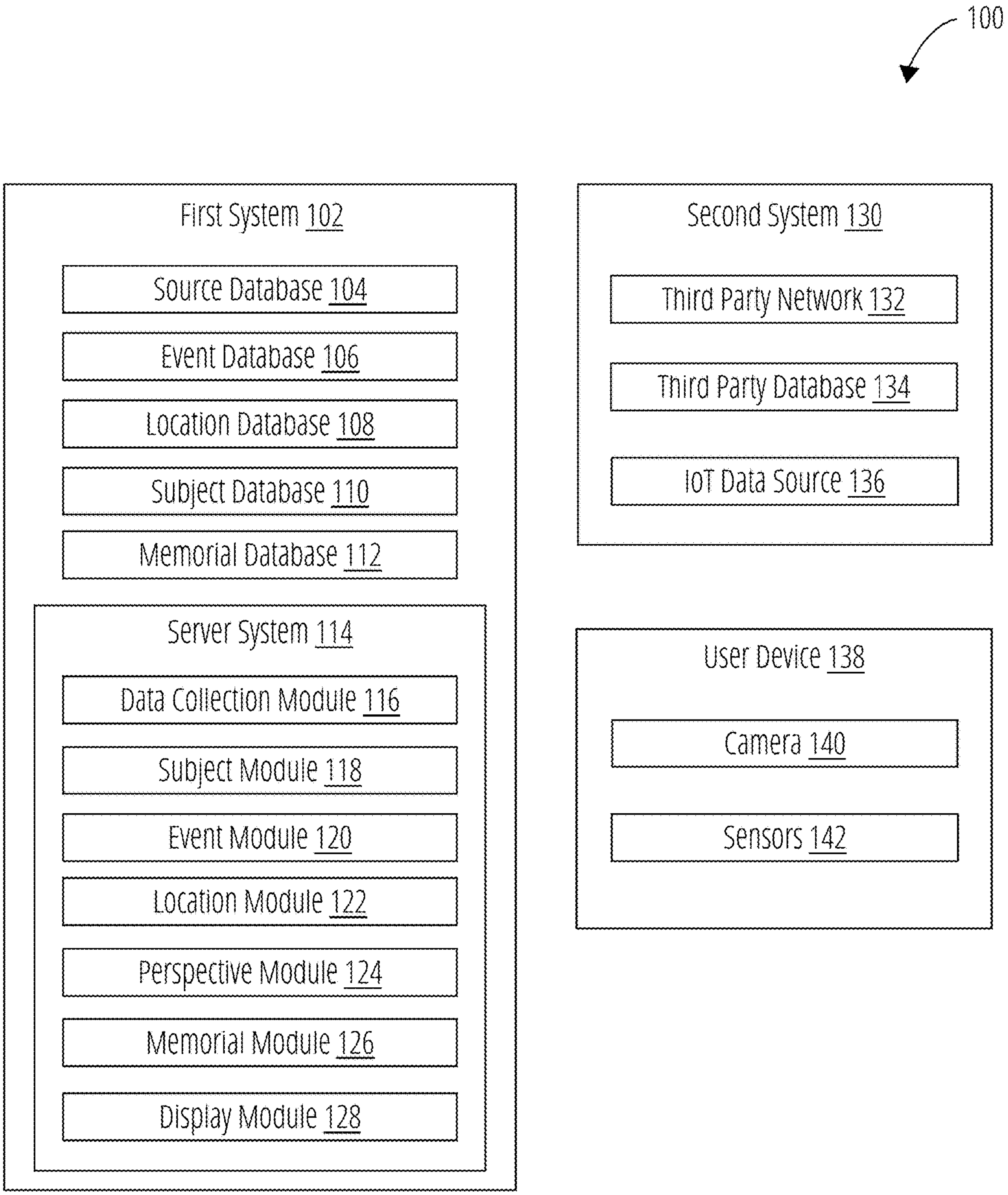
FIG. 1 is a block diagram illustrating an architecture of a story generation system, according to some examples.

Many of the embodiments described herein are described in terms of sequences of actions to be performed by, for example, elements of a computing device. It should be recognized by those skilled in the art that specific circuits can perform the various sequence of actions described herein (e.g., application-specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present technology may be embodied in several different forms, all of which have been contemplated to be within the scope of the claimed subject matter. In addition, for each of the embodiments described herein, the corresponding form of any such embodiments may be described herein as, for example, a computer configured to perform the described action.

Physical objects comprise one of the most basic forms of human connection. Objects document human achievement, connecting people, places, history, emotions, memories, feelings, cultures, etc. Objects can inform us of who we are and how we fit into the world around us—past, present, and future.

All objects have origin stories and narratives, having either been made by someone, something, some event, somewhere, at some time—all have a story to tell.

Historically, printing revolutionized communication by replacing objects with text. Today, rapidly advancing and evolving technology will connect, merge, attach and link objects with personal narrative stories and context via the Internet and within the virtual world. Without objects, stories lack vitality. Without stories, objects lack meaning. When stories and objects are linked, they provide a richness that takes the "experiencer" on a journey from the commonplace to the remarkable.

These newly created "Objects" will offer a universal language, not created for a specific audience, but they will "speak" to everyone. Objects associated and connected with relevant information will rapidly develop into the dominant method of articulating and communicating ideas, information, art, culture, music, sports, and literature, including various subject matter areas outlined in this document.

The Social Identity of Objects (SIO) and its technical framework of data and information free the fundamental limitation of physical objects alone and add context and human texture, liberating the isolation of the mere physicality of the object itself.

Liberated from a single isolated object, the SIO technology process will seamlessly associate all relevant information about a specific object and provide an increasingly valuable currency as a repository, sharing, and exchange platform. Embodiments of the SIO may comprise the aggregation of a plurality of data sources and types of data to create a cohesive story, timeline, or account of an object or collection of objects.

Humans require intuitive and emotional references to connect objects, events, and cultures as they navigate today's technology-intensive environment. Available personal time and attention are becoming an increasingly valuable commodity. As escalating volumes of information compete for our attention, the more connected and contextual that information, the more effective the utilization of our time.

Interconnected, fast-moving, complex environments require more intuitive means of communication. The SIO technology platform is not simply a framework for more information but instead offers an interactive tool for better understanding. For example, an aggregation of data related to a person, place, event, etc. from a plurality of sources may provide a more complete description of said person, place, event, etc. including context which might otherwise be overlooked or missing.

The conception of a physical object is that it exists in the physical world. Although alternative theories in quantum physics may present evidence to the contrary, physical objects or a physical body is a collection of matter existing within the boundary of a three-dimensional space. An object boundary may change over time, but it has a visible or tangible surface and specific properties. The aggregation of data from a plurality of sources may facilitate the creation of a story or timeline of events which may document such changes.

For example, a ball is spherical. However, the sphere may have unique properties (i.e., a tennis ball is fuzzy, a marble is smooth, a golf ball has surface dimples, etc.). Therefore, the form of a sphere may have infinite properties attached to it. Therefore, an object has an identity that may change over time, with changes capable of being tracked and annotated in real-time. The initial object identity may change based on outside physical forces or input but can also be augmented and amplified by information associated with the object itself. Such properties may be provided from a plurality of sources which may then be associated with similar accounts to create a more complete collection of properties describing the object.

In some embodiments, concepts of the presently disclosed technology can integrate and use associated information technologies and processes.

Today, an individual can interface with various devices that enable an enhanced understanding of the status and context of an object. For example, sensors can monitor systems and operating components of a house, and fitness trackers can help individuals understand more about their body's physical characteristics and performance. Objects can now combine technologies from multiple areas and integrate them into new infrastructures, providing a more robust and contextual experience for the user. As this process continues to grow and develop, we can reasonably expect every physical object will be identified with a unique internet address, allowing novel ways to experience and interact with physical objects and associated events connected to those objects. New information layers surrounding physical objects shape how users interact and connect the physical and virtual worlds. A plurality of data types, formats, sources, etc. may be used to compile a story about a person, place, event, object, etc. Likewise, the interfaces for interacting with such stories may comprise any of a traditional display, a holographic display, augmented reality, virtual reality, etc. In some embodiments, the interface may comprise audio or a combination of two or more interfaces. Interfaces may further allow for interaction with other users.

With accelerating technological developments, it will become commonplace that people to interact with objects on a new level in the virtual world via augmented reality (AR) and artificial intelligence (AI) capabilities. Information layers and narratives from various sources will be associated with specific objects, events, and products—enhancing value, engagement, and relationships with these objects, essentially creating a mixed reality environment with the convergence and synchronization of the real and virtual worlds. SIO is implementing a personal approach to capturing, analyzing, and displaying data, realizing that subjectivity and context can play a defining role in understanding objects, events, social changes, and culture.

The Social Identity of Objects (SIO) comprises a novel method of discovering objects through a system of relationships, attributes, and context of specific objects. Searches can be made in various ways and can be associated with a single type or choice of the different types of searches outlined hereafter in this document. The searches can be made based on any attributes or relationships of the SIO's within a single database or group of public or private databases.

Search examples might include color, size, date, retailer, container size, and relationships to other SIOs connecting unlimited associations or attributes attached with each type of registered or non-registered user by a menu-driven by choices.

Individual users can deploy unique search criteria based on their specific requirements. For example, a consumer might wish to see the complete narrative history of an object or product in any possible views—limited, for instance, to publicly available information only. Conversely, an individual might wish to explore the history of an object (i.e., sporting memorabilia) through associated narratives or stories and recollections via a network of private databases.

A manufacturer might wish to see the totality of details and attributes of all component materials, transportation, and pricing from the time of product inception which may be aggregated into a story. A pharmaceutical distributor might wish to have access to the entire product lifecycle, including its effects on the SIO such as feelings, returns, side effects, propensity to purchase again, etc.

In some embodiments, the concepts of the currently disclosed technology can integrate and use narrative history, product lifecycle, and associated technologies and processes.

It is safe to say that today's society, particularly the Internet, has experienced a proliferation of data unparalleled in human history. The terms "data" and "information" are often used interchangeably, but there are subtle differences between the two. Data is essentially "raw information" that can originate in any format as a number, symbol, character, word, code, text, visuals, sounds, graphics, etc. Data can also be analyzed and used to generate/create information that could not be obtained by simply observing the data element(s) alone. Information, therefore, is data put into context and utilized and understood in some significant way.

The term "information" eludes a precise definition—although its properties and effects arc ubiquitous and universal. The dictionary meaning of information includes the descriptors of 'knowledge,' 'intelligence,' 'facts,' 'data,' 'a message,' 'a signal,' which is transmitted by the act or process of communication. The information then can be roughly summarized as an assemblage of data in a comprehensible form, capable of communication.

Information only begins to embody meaning when presented in context for its receiver. When information is entered into and stored in an electronic database, it is generally referred to as data. After undergoing processing and retrieval techniques—such as associating attributes, characteristics, qualities, traits, elements, descriptors, and other associated data formatting—output data can then be perceived as usable information and applied to enhance understanding of something or to do something. Embodiments of the present disclosure may relate to information as elements of a story or a story itself which may be an aggregation of information.

The most common data types include 1.) Quantitative data is numerical data or data that can be expressed mathematically; 2). Qualitative data cannot be measured, counted, or easily expressed in numerical form. This data originates from text, audio, images, objects, artwork, etc. Qualitative data can be felt, described, and shared via data visualization tools, timeline graphics, infographics, and word narratives. 3). Nominal or categorical data is comprised of different categories that cannot be rank-ordered or measured. It is data that is simply used to identify or label a variable, including ethnicity, gender, eye color, country, marital status, favorite pet, type of bicycle, etc.; 4). Ordinal data contains values that follow a natural order within a known range. For example, income levels can be ranked in specific ranges in the order of priority or value but not used for calculating; 5). Discrete data, or categorical data, is divided into separate categories or clearly different groups. Discrete data contains a specific number of values that cannot be subdivided. For example, the number of people a company employs is a discrete data point; 6). Continuous data describes data that is measurable and observable in real-time. It can be measured on a scale or a continuum and further subdivided into finer values. Embodiments of the present disclosure may utilize such data types as elements of a story, which may be aggregated from one or more data sources.

Data processing takes place within a framework or system, divided into three distinct stages: 1). Data is collected, gathered, and/or input from various sources—retail locations, manufacturers, distributors, museums, educational organizations, service centers, sensors, and individuals. 2). Data is sorted, organized, cleansed, and input into a digital repository, database, or system. 3). Transformed into a suitable format that users can understand and use.

Quality data is the primary requirement for transformation into quality information: 1). Data must come from a reliable source; 2). Data should be complete without missing details; 3). Systems must be in place to eliminate duplicated data; 4). Data must add relevance and value to the database to generate meaningful information; 5). Data must be current and timely.

In some embodiments, the concepts of the currently disclosed technology can integrate multiple data types, quality information, retrieval requirements, and associated technologies and processes.

Information is any data that can be collected, formatted, digitized, produced, distributed, understood, deployed, and transmitted to the user/viewer/receiver. While the concept of information is exceptionally broad, it can include anything from personal narratives, stories, conversations, art literature, visual images, and multi-media. In an embodiment, such organization of information or data may be associated such that the information and/or data may be aggregated into one or more stories.

While information is virtually unlimited in scope and variety, there are common types or categories of information that are often cited: 1). Sensory information includes information that can be "experienced" by the human senses—sight, sound, smell, taste, and touch. These "sense information" variants are humans' primary connection to the physical/outside world; 2). Biological information includes any information found in the study of living organisms and/or associated processes that can control or be perceived by the body; 3). Conceptual information or any abstraction that can be experienced apart from physical reality. Concepts are the opposite of tangible items and have no physical manifestations; 4). Imagination information is constructed/conceived in the human mind in the form of an idea or story that can be communicated and used to create new thoughts and ideas; 5). Knowledge information includes "factual" information and "know-how" that is specifically designed and intended for human use and application; 6). Extended knowledge information can only be generated by human experience and action and not via an instruction manual or book; 7). Data or that which is specifically designed and utilized in systematic analysis, machine learning, and Artificial Intelligence. For example, a collection of test scores or temperature readings are examples of specific data elements; 8). Knowable unknowns and knowing what is unknown can be valuable information. The more knowledge we attain—the more we recognize is unknown; 9). Intelligence is the ability to build upon known information and create new meaning and connectivity with objects and emotions, cultures, and events; 10). Misinformation is information that is wrong or incorrect. Faulty data, flawed logic, and other errors can generate misinformation; 10). Disinformation is the deliberate distribution of "propaganda" designed to advocate for a specific message or agenda—often including a negative social context; 11). Situational information directly connected to a specific situation cannot be separated from its context; 12). Dispersed knowledge is information that exists in multiple locations/areas and not simply in one place. For example, multiple observers witnessing a single event from various viewpoints will form uniquely dispersed knowledge; 13). Asymmetric information includes information of "superior" value to comparable information. For instance, a stock trader may have critical information on corporate earnings report to enable better transaction decisions.

In some embodiments, the concepts of the currently disclosed technology can integrate multiple information types, collected, formatted, digitized, distributed, and associated technologies and processes.

SIO utilizes eight specific data search view techniques in its system framework or what is called "Smart Label Views/Search" to access data and transform it into usable information. The first is the holistic view. A holistic view refers to the complete data set "picture." Gaining this comprehensive view requires looking at the data throughout its entire lifecycle—from the moment an object originates until the information is needed by an individual at the current moment of retrieval. An embodiment of such a holistic view may comprise a story, comprised of a plurality of data elements from a plurality of data sources which may be aggregated according to a common theme or search term.

The holistic data approach is designed to improve data analysis and integration by enabling information to be distributed across multiple platforms and systems efficiently and consistently. The first component of the holistic data process includes data collection—assembling information from a variety of sources, both public and private. Data collection can be compiled and identified from structured, semi-structured, and unstructured sources, including operational systems (i.e., CRM, financial systems), website information, social media, and user-supplied narratives and stories.

The second component includes data integration and transformation, coalescing disparate data from multiple sources into an easily accessed and usable database(s). These integrated data and information assets provide the foundation for seamless and rapid access by end-users. Data integration and transformation rely on data quality, consistency, and control. The SIO solution provides processes that are repeatable, automated, and scalable to meet future user demand.

Third, presenting holistic data in a meaningful format(s) when requested, maintaining and supplementing data within a structural framework, increasing in value over time will remain a source of evolving relevance to users. Presentation techniques can uncover key metrics, trends, and exceptions and offer customized and unique visualizations. Embodiments of the present disclosure may relate to the presentation of data in the form of a narrative or story. A story may comprise the aggregation of data into a format which may comprise a transcript, image, timeline, video, audio, etc.

Fourth, maintaining data quality and consistency is critical for the long-term viability of holistic data. SIO will deploy tactics including identifying data quality thresholds, fraud alerts, audit report functionality, and robust data governance protocols. All SIO master data repositories and data privacy strategies will be applied to all users. In embodiments, data quality may include a system and/or method of verifying the accuracy or truthfulness of data.

In some embodiments, the concepts of the currently disclosed technology can integrate and use holistic data technologies and processes.

The humanistic view of data or human-centric approach is intended to provide personalized experiences for the user, offering a revolutionary future for data visualization. Unlike the traditional methodology where questions are asked, and answers are found, the humanistic view of data is contextual or related to a specific object, circumstance, event, or relationship. Data views are transformed into visual representations in this process, adding considerable substance and context to the experience such as the creation of stories.

SIO technology will leverage information from people with a personal connection to specific objects, events, and cultures. This human-centered approach to the origination, management, and interpretation of data provides value and importance for the people it came from and other people it will benefit from. SIO will create a trusted relationship strengthened by transparency within its system framework.

SIO is implementing a personal approach to how data is captured, analyzed, and displayed, realizing that subjectivity and context can play a defining role in understanding objects, events, social changes, and culture. A human-centric approach to data has the greatest potential for impact when going beyond gathering data to create personalized commercial/retail experiences. SIO will deploy its technology to understand the values and needs of people in the larger context of their lives. In some embodiments of the present disclosure, context may refer to the aggregation of data to form a story.

In some embodiments, the concepts of the currently disclosed technology can integrate and use human-centric data technologies and processes.

Chronological, historical, or timeline view data, broadly considered, is collected about past events and circumstances about a particular object, information set, or subject matter. Historical data includes most data generated manually or automatically and tracks data that changes or is added over time. Historical data offers a vast array of use possibilities relating to objects, narratives, cultural events, project and product documentation, conceptual, procedural, empirical, and objective information, to name a few. Embodiments of the present disclosure may relate to chronological data by improvements in the aggregation of such data with data which otherwise may not intuitively be associated with a chronological context and provide the data as a story, adding context to a chronology of events. Likewise, people, objects, etc. each have their own chronology which may be expanded upon with further context via the creation of a story.

With increased cloud computing and storage capacities, data collection and retrieval allow for more data stored for greater periods with access by more users. Since data storage does require resources and maintenance, data life cycle management (DLM) can ensure that rarely referenced data can be archived and accessed only when needed.

Data preservation is essential and provides users 1.) the ability to understand the past; 2.) a deeper understanding of the evolution of patterns and information over time, providing insights and new perceptions about objects, events, and information. 3.) Enable possible future assessments about cultures, aesthetics, symbols, social interaction, and systems.

Historical data collections can originate from individuals using laptops, smartphones, tablets, or other connected devices. Data can be captured via smartphone cameras, collected via sensors, satellites and scanners, micro-chips, and massive arrays. There is no digital object or system that is not within the scope of digital preservation. Digital technologies are a defining feature of our age and have become the core commodity for industry, commerce and government, research, law, medicine, creative arts, and cultural heritage. The future will hinge on reliable access to digital materials while families and friends extend and sustain their relationships through digital interactions with objects and their history. The more society depends on the importance of digital materials and history, the greater the need for preservation and access by future generations and shared collaboration.

In some embodiments, the concepts of the currently disclosed technology can integrate and use chronological/historical data views and timelines and associated technologies and processes.

Data cluster view techniques are based on similarities among data points. Data clusters show which data points are closely related, so the data set can be structured, retrieved, analyzed, and understood more easily. Embodiments of the present disclosure may leverage data clustering to form association which may be used to aggregate data to form stories.

Data clusters are a subset of a larger dataset in which each data point is closer to the cluster center than to other cluster centers in the dataset. Cluster "closeness" is determined by a process called cluster analysis. Data clusters can be complex or simple based on the number of variables in the group.

Clustered data sets occur in abundance because all the events we experience and that we might wish to identify, understand, associate with specific objects and act upon have measurable durations. It, therefore, follows that the individual data points associated with each instance of such an event are clustered with respect to time. Many events associated with clustered data can be highly significant, and it is important to identify them as accurately as possible.

Clustering is deployed for high-performance computing. Since related data is stored together, the related data can be accessed more efficiently. Cluster views deliver two advantages: efficiency of information retrieval and reducing the amount of space required for digital storage. Information related and frequently requested is ideal for cluster viewed data requirements.

In some embodiments, the concepts of the currently disclosed technology can integrate clustered view data technologies and processes.

Data visualization is a methodology by which the data in raw format is portrayed to reveal a better understanding and provide a meaningful way of showcasing volumes of data and information. Various methods of data visualization and viewing options can be deployed for various purposes and information sets, including but not limited to: Biological views, Legacy views, sentimental views, significance views, monetary/financial views, consumer views, supply chain views, and social views, and other views not yet imagined. For example, in supply chain, there is a need to create data visualizations that capture the connectedness of objects through time and space in relation to variables such as materials, timelines, locations on a map, companies and humans involved in the construction, consumption and delivery of such objects. Additionally, the system may be able to display the "story" that is created and understood when these elements are combined. In one example, the system may display these objects as data as a user would see in a readout visualization, or data extraction interface. In another example, the system may display a view that shows the layers of connectedness and relationships of objects in a grid or other rich digital media display. Embodiments of the present disclosure may relate to data visualizations as methods of presenting stories comprise of aggregated data or information to a user.

The system that asks the "right questions" will generate information that forms the foundations of choosing the "right types" of visualization required. Presenting information and narratives into context for the viewer provides a powerful technique that leads to a deeper understanding, meaning, and perspective of the information being presented.

A clear understanding of the audience will influence the visualization format types and create a tangible connection with the viewer. Every data visualization format and narrative may be different, which means data visualization types will be fluid and ultimately change based on goals, aims, objects, or topics. Presentation technologies are becoming increasingly dynamic, and by better understanding user-based preferences, individual stories can be accurately portrayed. Embodiments of the present disclosure may relate to the audience as a perspective, or an element of the perspective which may influence or direct the information aggregated to create a story.

In some embodiments, the concepts of the currently disclosed technology can integrate multiple data visual format technologies and processes.

A hierarchical data view is defined as a set of data items related to each other by categorized relationships and linked to each other in parent-child relationships in an overall "family tree" structure. When information needs to be retrieved, the whole tree is scanned from the root node down. Modern databases have evolved to include the usage of multiple hierarchies over the same data for faster, easier searching and retrieval. Embodiments of the present disclosure may relate to hierarchical data by improvements in the methods of aggregating data to form stories which may be illustrated in a hierarchical form.

The hierarchical structure of data is important as the process of data input, processing, retrieval, and maintenance is an essential consideration. An example would include a catalog of products, each within specific categories. Categories could be high-level categories such as clothing, toys, appliances, and sporting goods—however, there may also contain subcategories within those: in clothing, there may be pants, jackets, shoes—toys might include board games, action figures, and dolls. Within subcategories, there may be even more categories and so on.

The hierarchical database model offers several advantages, including but not limited to 1). The ability to easily add and delete new information; 2). Data at the top of the hierarchy can be accessed quickly via explicit table structures; 3). Efficient for linear data storage applications; 4). It supports systems that work through a one-to-many relationship; 5). It's a proven storage and retrieval model for large data sets; 6). Promotes data sharing; 7). A clear chain of authority and security.

In some embodiments, the concepts of the currently disclosed technology can integrate hierarchical database models, technologies, and processes.

A spherical data view is a form of non-linear data in which observational data are modeled by a non-linear combination model relying on one or more independent variables. Non-linear methods typically involve applying some type of transformation to the input dataset. After the transformation, many techniques may be tried to use a linear method for classification.

Data credibility is a major focus implemented to ensure that databases function properly and return quality data and accurate information to the user. In the SIO system, a weighted average technique of ensuring data quality can be utilized and includes processing a collection of each of the data attributes such as location, type of device, history, individual, current, and past relationships with other SIOs and many others to determine the credibility of the SIO data. For example, a search for a product grown in a certain location by a specific farm might include information relating to climate, seed varietal, farm name, sustainable price, location, compliance with regulations, and organic certification. This process evaluates the average of a data set, recognizing (i.e., weighing) certain information as more important than others.

Verifying data integrity is an extremely important measure since it establishes a level of trust a user can assign to the information returned and presented. Credible data can only be assured when robust data management and governance are incorporated into the system. Satisfying the requirements of intended users and associated applications will assure the highest quality data, including but not limited to 1). Accuracy from data input through data presentation; 2). Exceptional database design and definition to avoid duplicate data and source verification;

3). Data governance and control; 4). Accurate data modeling and auditing; 5). Enforcement of data integrity; 6). Integration of data lineage and traceability; 7). Quality assurance and control.

In some embodiments, the concepts of the currently disclosed technology can integrate spherical data views and data credibility control technologies and processes.

A framework in computer programming is a structure used as a base environment or foundation upon which programmers and developers create software applications deployed on a specific platform(s). Frameworks are designed to be versatile, robust, and efficient, offering a collection of software tools and services that eliminate low-level and repetitive processes, allowing developers to focus on the high-level functionality of the application itself. Programming frameworks are typically associated with a specific programming language and are designed to accelerate the development process, so new applications can be created and deployed quickly.

A blockchain framework provides a unique data structure in the context of computer programming, consisting of a network of databases/virtual servers connected via many distinct user devices. Whenever a contributor in a blockchain adds data (i.e., a transaction, record, text, etc.), it creates a new "block," which is stored sequentially, thereby creating the "chain." Blockchain technology enables each device to verify every modification of the blockchain, becoming part of the database and creating an exceptionally strong verification process. Embodiments of the present disclosure may relate to blockchain frameworks wherein data may be stored as blocks within a blockchain, or a story or query used to generate a story, may comprise a block or series of blocks in a blockchain.

Security provided by this distributed ledger/data process is among the most powerful features of blockchain technology. Since each device holds a copy of these ledgers, the system is extremely difficult to hack—if an altered block is submitted on the chain, the hash or the keys along the chain are changed. The blockchain provides a secure environment for sharing data and is increasingly used in many industries, including finance, healthcare, and government.

Blockchains are typically divided into three distinct types and can be managed differently by the network participants. They include 1). Public blockchain: open to a wide range of users where anyone can join a network and are by design "decentralized systems" where participants can read, add entries, and participate in processes. Public blockchains are not controlled by third parties; 2). Private blockchain: open to a limited number of people, is typically used in a business environment where the content in the blockchain is not shared with the public and can be controlled by a third party; 3). Hybrid blockchain: a mixture of private and public blockchains that is not open to everyone but still offers data integrity, transparency, and security features that are novel components of the technology. Blockchain technology is a novel and disruptive technology and can accommodate highly scalable applications.

In some embodiments, features of the disclosed technology can integrate computer programming and blockchain technologies and processes.

Blockchain security and cryptographic protocols make this technology increasingly attractive for business models and applications where provenance and authenticity are critical. While blockchain is well-known for applications in the cryptocurrency world, it is becoming an essential component of applications for non-fungible tokens (NFT).

If something is fungible—it is interchangeable with an identical item—NFTs, on the other hand, are unique and non-interchangeable units of data stored on a blockchain—therefore, one NFT is not equal to another. NFTs are usually associated with reproducible digital files such as photos, artwork, historical objects, narratives, videos, and audio. The possibilities for NFTs within the blockchain framework are virtually endless because each NFT is unique yet can evolve over time. The value of NFTs is in their "uniqueness" and ability to represent physical objects in the digital world. Embodiments of the present disclosure may relate to NFTs such that a story may be an NFT.

Once an NFT is created, it is assigned a unique identifier that assures authenticity and originality. Each NFT is unique, so all the information about the token is stored on the blockchain—meaning if one "block" in the chain fails, information will still exist on another block, ensuring the NFT remains safe and secure indefinitely.

The unique capabilities of blockchain technology coupled with NFTs guarantee the authenticity, originality, and longevity of objects, artwork, cultural items, and music tracks, among a host of other categories. With blockchain technology, it is impossible to copy or reproduce an NFT, and ownership is recorded in an unalterable way.

Tracking and exchanging real-world assets in the blockchain can assure that the asset has not been duplicated or fraudulently altered. NFTs are not limited to purely digital items, but digital versions of objects from the physical world can be attached to specific narratives and stories. Unlike digital media, represented by codes and numbers—physical objects are separate entities that can carry intuitive connections.

For instance, human memories can be connected to a physical object providing meaning and context for the viewer. A toy may be linked with a story that can transport the viewer back to a childhood experience—not necessarily connected to any monetary value but a narrative memory wrapped within the object itself. Narratives can be associated with anything, from a book of recipes passed from one generation to the next or table favors from a wedding. We are a society that collects "things," and these objects all have unique meaning and context.

An innovative example of this technology is occurring in cultural heritage preservation. Collecting and preserving cultural heritage data, objects, and associated narratives allows communities to interact with historical and culturally relevant artifacts and objects in unique and novel ways. These objects communicate with the viewer through the memories we associate with them. Global historical events and objects are inextricably linked to personal histories. Embodiments of the present disclosure relate to cultural heritage preservation by improving the aggregation of data from a plurality of data sources relating to artifacts and accounts to form stories with improved context. The context may further be improved using systems and methods to quantify and account for the reliability, accuracy, and truthfulness of data and data sources.

The lines of separation between the digital and physical worlds are converging—as virtually any object can be connected to the Internet. Enhanced programming platforms, sensors, AI, Augmented reality, intuitive applications, and increased bandwidth capabilities will make "connected objects" more useful and interactive. As information proliferates, the power to connect stories with objects will shape wisdom, culture, and future generations.

In some embodiments, the concepts of the disclosed technology can integrate Non-fungible tokens (NFT) technologies and processes.

"Historocity" or "Historacity," as defined by the inventors herein, is a specialized metric designed to quantify the aggregated historical value of an artifact, or a collection thereof. Unlike the traditional concept of historicity, which is limited to the verification and authentication of historical events, characters, or phenomena, Historocity expands the scope to include three additional dimensions: popularity, trust or certification, and value associated with objects. Popularity is measured by the level of public attention an artifact or its associated elements have garnered over time, through public mentions, scholarly references, or social interactions. Trust or certification quantifies the level of confidence in the provenance or authenticity of the artifact, established through expert opinions, credentials, or documented evidence. The value associated with objects allows for comparison of other similar objects across many domains, monetary value being the most obvious. For example, two nearly identical baseballs may sell for entirely different orders of magnitude based on the stories told about them, e.g., a slightly used baseball may sell at a yard sale for $2 after a member of the household has lost interest in the sport, compared to Mark McGwire's No. 70 in 1998 baseball, which sold for $3 million. The calculation of Historocity integrates these multidimensional data points to produce a composite value that can be represented numerically or categorically. In some instances, this value is further refined by integrating social or sentimental factors, yielding an even more comprehensive value termed "Aggregated Historocity." This aggregated value not only serves as a holistic measure of the artifact's historical significance but also holds transactional utility. It can be sold, transferred, willed, or loaned either independently of the physical artifact or in conjunction with it. Historocity provides a robust framework for evaluating the comprehensive historical significance of artifacts and collections, offering utility for curators, researchers, and collectors alike.

The Social Identity of Objects and their associated Historocity scoring system presents a novel method of determining an object's significance based on a combination of various value systems. Throughout history and across cultures, value systems have continuously evolved to shape human beliefs, behaviors, and decision-making processes. For instance, the perception of time has been universally regarded as a treasured resource, prompting individuals to focus on punctuality and efficiency. Similarly, the value attached to money, and its cultural derivatives like currency, signifies the emphasis on financial stability and prosperity. While these tangible assets possess clear worth, abstract concepts like social and relationship values underscore the importance of interpersonal connections, community bonds, and societal contributions. Historical values emphasize the reverence for past lessons, traditions, and inheritances, whereas personal and intrapersonal values reflect an individual's internal beliefs about self-worth, growth, and potential. Objects can also carry sentimental value, representing emotional bonds, memories, or significant life moments. Spiritual systems provide perspectives on existential beliefs and moral codes, influencing one's view on life's purpose and ethical considerations. Furthermore, in an era of growing environmental consciousness, the significance of preserving our natural surroundings is reflected in environmental values. Lastly, educational value, focusing on the efficacy and relevance of learning experiences, emphasizes the importance of knowledge acquisition and cognitive development. By integrating these multifaceted value systems into the Historocity scoring, the Social Identity of Objects offers a comprehensive, nuanced, and culturally sensitive method to ascertain an object's importance in a given context.

To further expand on the Historocity scoring system in the Social Identity of Objects, other value systems may be considered. Incorporation of emotional value addresses the complex spectrum of human feelings attached to objects or experiences. This encompasses not only positive sentiments like joy and nostalgia but also accounts for potential negative associations. Understanding that our connections with items aren't merely functional but deeply emotional provides a holistic view of an object's significance. Location value accentuates the importance of geographical positioning in determining an object's relevance. Economic and social attributes of a location, combined with factors like access to essential amenities and safety, play a pivotal role in an object's value. This dimension not only provides context but also highlights the dynamic interplay of market forces and socio-economic conditions in shaping perceptions of value. Intrinsic value incorporates a philosophical perspective of the value of an object, emphasizing the inherent worth of an object or entity, irrespective of its market-driven or functional value, this may be especially true when considering human life or other fundamental human values. This provides the concept that certain objects, beings, or environments possess value purely based on their existence or innate qualities outside of any other value system. Spatial value can be considered in terms of, for example, urban planning and architecture, stressing the value derived from specific spatial contexts, e.g., a certain amount of square or cubic footage my have some value regardless of (or despite) its contents. This could be an urban park or a historical site. The worth isn't just aesthetic but also pertains to economic implications, functionality, and broader urban development strategies. Physical value may be tangible metrics on the material properties and performance capabilities of objects.

The Historocity scoring system of the Social Identity of Object may further incorporate or reflect upon various additional value paradigms, including Fiat value, underpinned by government regulation and policy, remains contingent upon macroeconomic trends, political stability, and regulatory decisions, rendering its value both influential and volatile. Conversely, the cryptocurrency value, powered by cryptographic technology such as blockchain, is anchored in decentralized systems and garners its worth from technological trust and its potential to redefine financial structures. Driven by market sentiments, technological evolutions, and regulatory climates, its fluidity mirrors the dynamic nature of digital asset valuation. These thoughts, influenced by sociocultural dynamics, remain transformative to societies. Adjacently, copyright value provides protection to the value created by creativity and innovation, offering both economic rights and a moral stance to creators. Through licensing and intellectual property management, this value protects and incentivizes originality. The essence of moral value is rooted in the ethical compass guiding societies and individuals. Often universal, and sometimes relativistic based on cultural differences, these principles provide the ethical framework navigating society and life. Similarly, cultural value celebrates the plethora of human expressions, traditions, and practices, emphasizing shared heritages and identities. Regional value underscores the significance of geographical locales, intertwining economic, cultural, and social dimensions. This value promotes local entrepreneurship, strengthens cultural and social assets, and galvanizes community pride. Through regional development endeavors, it perpetually seeks to uplift, innovate, and harness regional potential.

Furthermore, a Historocity scoring system endeavors to incorporate a myriad of value systems, such as, for example human value, which emphasizes the innate worth of every individual, highlighting the significance of human rights, social justice, and overall well-being. Such a system promotes respect, autonomy, and the holistic growth of each individual, free from discrimination. Sustainability value underscores the importance of sustainable practices that balance economic, social, and environmental considerations. The objective of such a value system is to optimize present needs without jeopardizing future generations, emphasizing the reduction of environmental footprints and promoting sustainable development. Business value offers a perspective on the significance of a company's contributions to stakeholders, quantified through financial metrics, market presence, and societal impact. Economic value provides a means to evaluate the worth of goods, services, or assets in a market setting. It not only addresses the demand-supply dynamics and innovation but may also underscore the importance of addressing societal issues and environmental protection. Self-value emphasizes the inherent worth and self-perception an individual possesses, reflecting on their mental well-being and overall life satisfaction. It is intrinsically linked to one's self-image, confidence, and overall life outcomes. Environmental value emphasizes the significance of preserving and valuing the natural environment. Instrumental value provides an estimate of the tangible benefits derived from the environment, signifying the interconnectedness between human well-being and environmental health. Health value focuses on the importance of physical and mental health, which is fundamental for individual well-being and societal progress.

In the Social Identity of Objects (SIO) network, a Historocity scoring system is introduced to facilitate the exploration and ranking of individual objects and collections. The system computes relative scoring metrics based on multiple value systems, both mentioned and unmentioned. Users can evaluate and order objects or collections in accordance with these metrics, providing flexibility to accommodate any past, present, or future value system for comprehensive object assessment.

FIG. 1 is a block diagram illustrating an architecture of a story generation system 100. Story generation system 100 is a system that can organize and manage a large amount of content related to stories. The story generation system 100 consists of building blocks, which are objects with rich data attributes such as events, characters, locations, organizations, etc. Such objects may be created and edited by users or automatically by modules. The system also includes references to source materials stored in a source database, which may be, for example such as news articles, social media posts, or academic papers, etc. These sources are used to create and support the building blocks, allowing users to see where the information originated and how it is related to other objects.

This system comprises a first system 102 that may collect and store a social identity of objects (SIO's). The first system 102 enables instantiation of SIO data for each object in the system, and recommends data based on time, place, space, written tags, photos, videos, descriptions, commonality, and emotions to be displayed through an interface, among other functions. The first system 102 may further be used to assess and verify the accuracy of an object or stories which may be comprised of one or more objects. Truth may be based upon verifiable facts, or by corroborating the one or more objects with one or more similar or verifiable accounts. For example, a plurality of accounts may describe a series of events during a baseball game. While the perspectives of each account may vary, some common elements can be corroborated such as the teams and players involved, the location and time of the game, the weather during the game, the plays which occurred, etc. Verifying common details may provide confidence that the source of the data is trustworthy and therefore their account can be trusted. By contrast, if elements of an individual's account conflicts with the majority of other accounts, then the individual may be deemed less trustworthy, and therefore their story may not be trusted. The first system 102 may additionally aggregate data, such as data about human history, and upon selection of one or more parameters, may generate a story comprised of one or more relevant accounts of subjects, events, and/or locations which may then be structured, such as in the chronological order of events, or as locations and/or features as a map, before being presented to a user.

A source database 104 stores data relating to sources of data and the trustworthiness or reliability of the source. A source may refer to an individual providing one or more stories, such as via oral dictation, uploading a recording, providing a written dictation, a pictorial representation, etc., or may alternatively refer to a written text, publication, publisher, website, company, or other organization, etc. A source may additionally refer to third party networks 132, third party databases 134, IoT data sources 136, etc. In some embodiments, a source may refer to a user device 138 or a camera 140 or a sensor 142.

For example, a source may be a website such as Wikipedia. As another example, a source may be a news company, website, or newspaper publisher such as Reuters or the Associated Press. As another example, a source may be a particular weather station or meteorologist. The trustworthiness or reliability may be represented by a binary 'trustworthy' or 'untrustworthy' data type or may alternatively be represented by a qualitative range of values such as 'trustworthy', 'somewhat trustworthy', 'unknown trustworthiness', 'somewhat untrustworthy', or 'untrustworthy'. Similarly, trustworthiness or reliability may be represented by a quantitative value, such as a score. The score may represent a probability that the source can be trusted, which may be interpreted as the likelihood that the source is accurately describing the truth. A quantitative value may alternatively utilize a regressive method to adjust the source's reliability score based upon each accurate or inaccurate contribution which may comprise any of a story, object, object characteristic, etc. Source reliability may additionally be impacted by credentials, such as whether a source is determined to be a specialist in a given field, or alternatively if manually adjusted. Additionally, the amount a reliability score is adjusted may be impacted by the degree to which the source's contribution is inaccurate or the relative reliability scores of corroborating sources and data.

An event database 106 stores data related to time-related events or data comprising time-based data such as one or more dates, times, and may additionally include descriptions and/or characteristics of what occurred at the specific date and/or time. The resolution of event data in respect to time may vary. For example, an event may reference a time accurate to a second or a fraction of a second, or may reference a specific minute, hour, day, week, month, year, or span of multiple years. For example, an event may describe the D-Day landings during World War II which occurred on Jun. 6, 1944. Alternatively, an event may describe World War II, which could be referenced as occurring between 1939 and 1945 or may more precisely be referenced as occurring between Sep. 1, 1939, and Sep. 2, 1945. Event data from one source may be associated with data from a plurality of other sources. Associated data may not match exactly. For example, if a first source referred to World War II as occurring between 1939 and 1945, while a second source referred to World War II as occurring between Sep. 1, 1939, and Sep. 2, 1945, the two references would be associated as they are both true, though they use different resolutions of time-based data as they both accurately describe World War II.

A location database 108 stores data related to location-related data such as a continent, country, state, city, town, street, address, building, etc. Location-related data may also comprise GPS coordinates, regions, including common names, as well as geographic features, such as mountains, valleys, canyons, rivers, streams, lakes, oceans, etc. For example, a location may be a length of coastline called Omaha Beach in Normandy, France. In some embodiments, the geographic location may change based on the passage of time. For example, the coastline is otherwise not known as Omaha Beach until 1944, when it was given the designation during the planning and execution of the D-Day landings. Location from one source may be associated with location data from other sources. Associated data may not match exactly. For example, Omaha Beach may be associated with Normandy, France. Likewise, France may be associated with Europe. Other examples may comprise Wallstreet in Manhattan, New York. Likewise, Manhattan, New York may be associated with New York City, New York. New York City may also be referred to as the Big Apple, and was historically known as New Amsterdam, therefore such references may be associated.

A subject database 110 stores data related to subjects, which may be people, animals, objects, etc. In some embodiments, the subject database 110 stores data primarily related to people. The subject data may relate to specific people, or groups of people. Groups of people may be referenced directly or may comprise an aggregation of data about people belonging to or who can be associated with the group. For example, a US soldier during World War II, John Smith, may be associated with the $16^{th}$ Infantry Regiment he was a part of because he was a member of the unit. Likewise, the 16th Infantry Regiment was involved in D-Day landings on Jun. 6, 1944, while John Smith was a member, therefore John Smith may additionally be identified as an Allied soldier who participated in the D-Day Landings.

A memorial database 112 may store data related memorial parameters. The memorial parameters may include a person, place, thing, event, etc. being memorialized. The memorial parameters may additionally comprise one or more locations describing where the memorial may be geolocated such that the memorial may be accessed and/or viewed when an individual is in that location. Likewise, the memorial parameters may further comprise one or more times describing when the memorial may be accessed and/or viewed. A memorial parameter may additionally comprise one or more individuals or groups of individuals who may have access to the memorial and may further include the content comprising the memorial, such as images, videos, audio recordings, text, etc. documenting one or more shared experiences and/or accounts related to the individual, place, thing, etc. being memorialized. In an example, John Smith, a World War II veteran who fought in the D-Day landings was married at a church at 46.3872° N, 4.3201° E on Jan. 6, 1948. A memorial accessible by his widow on January 6$^{th}$ within 500 feet of the coordinates of the church where they were married may comprise a 5-minute video collage of shared memories between John and his widow including photos and video of their wedding, anniversaries, his birthdays, memories of their children, and may include audio and video recorded of him while he was alive, and/or from friends and family recounting memories of/with him. Content may additionally comprise photos, stories, and awards earned by John Smith during his service, particularly if in this example, John Smith met his wife during his service during World War II. Another memorial may exist for the same individual which is customized for his close friend whom he served with in the 16th Infantry Regiment during World War II including the D-Day landings. The memorial may be accessible in a plurality of locations, such as at the cemetery where John Smith is interred, a bar they frequented, a riverbank at which they frequently went fishing, etc. Likewise, the memorial may be available at a plurality of times or may always be accessible with no restriction to time. Memorial parameters may not include limitations regarding where or when the memorial may be accessed. In some embodiments, the memorial parameters do not limit the access of a memorial, but instead define a time and/or place when an individual and/or group of individuals may receive a notification, reminder, etc. prompting access and/or view of the memorial, such as at places and/or times which may be significant to the individual being memorialized, the individual or group of individuals, or shared significance for the individual being memorialized and the individual or group of individuals.

The server system 114 initiates the data collection module 116 and receives data elements collected and identified by the data collection module 116. The server system 114 selects a first data element and initiates the subject module 118, by sending the selected data element. The server system 114 may receive subject data comprising data associated with the selected data element. The server system 114 initiates the event module 120, by sending the selected data element and receiving event data comprising data associated with the selected data element. The server system 114 initiates the location module 122, by sending the selected data element and receiving location data comprising data associated with the selected data element. The server system 114 may then optionally initiate one or more optional modules, by sending the selected data element and receiving data related to the optional module comprising data associated with the selected data element. If there are more data elements, another data element is selected. Further the subject module 118, the event module 120, the location module 122, and optionally one or more optional modules, may be initiated for each selected data element. If there are no additional data elements, the server system 114 initiates the perspective module 124 and receives data related to a user perspective which has been aggregated and presents the aggregate data to a user as a story. The story may comprise part or the totality of a memorial to be displayed to a user when one or more memorial parameters are satisfied. The memorial module 126 is initiated and memorial parameters are received such that when they are satisfied a memorial may be accessed and/or viewed. The display module 128 is initiated and if the memorial parameters corresponding with a memorial are satisfied, a memorial is accessible and/or displayed to a user. The server system 114 receives a display status and ends the memorial generation, detection, and display process.

receives data from a data source which may be any of a user via a user device 138, a camera 140, one or more sensors 142, a second system 130, third party network 132, third party database 134, IoT data source 136, etc. The data collection module 116 identifies one or more data elements from the received data and queries a source database 104 for a source reliability score, or for data to facilitate determining a source reliability score. The received data, identified data elements, and source reliability score(s) are then saved to each the event database 106, the location database 108, and the subject database 110 depending on the relevance of the identified data elements to each of the databases. In some embodiments, the identified data elements may additionally be saved to one or more optional modules such as a migrations module, a catastrophe module, a war module, etc. The identified data elements are then sent to the server system 114.

The subject module 118 is initiated by the server system 114 from which it receives a data element and queries a subject database 110. A subject similar to the received data element is selected and the received data element and the selected subject data are compared to determine whether they match. The data element and subject data match if it can be determined that the data describe the same subject, or person. If the data matches, the data are saved to the subject database 110 as matching subjects, that is that they describe the same subject or can be associated with each other, such as may be the case if the data element and the selected subject comprise different levels of specificity, such as describing a soldier versus a specific person who is a soldier. The subject module 118 checks whether there are more subjects similar to the received data element. If there are more similar subjects, another subject is selected, and the comparison process is repeated until there are no remaining similar subjects. If there are no similar subjects which match or can be associated with the received data element, the received data element may be saved to a subject database 110 as a new subject. The received data element may be saved as a new subject even if it matches or is associated with one or more subjects if the received data element is more specific than the matched or associated subject data. For example, if the matched or associated subject data relates to a United States soldier, the received data element may be saved as a new subject if it comprises descriptions of the specific soldier, John Smith. The saved subject data may additionally comprise a source reliability or trust score. The matching and/or associated subject data is then sent to the server system 114.

The event module 120 is initiated by the server system 114 from which it receives a data element and queries an event database 106. An event similar to the received data element is selected and the received data element and the selected event data are compared to determine whether they match. The data element and event data match if it can be determined that the data describe the same event. If the data matches, the data are saved to the event database 106 as matching events, that is that they described the same event or can be associated with each other, such as may be the case if the data element and the selected event comprise different levels of specificity, such as describing a battle, such as the D-Day landings, and a war, such as World War II. The event module 120 checks whether there are more events similar to the received data element. If there are more similar events, another event is selected and the comparison process is repeated until there are no remaining similar events. If there are no similar events which match or can be associated with the received data element, the received data element may be saved to an event database 106 as a new event. The received data element may be saved as a new event even if it matches or is associated with one or more events if the received data element is more specific than the matched or associated event data. For example, if the matched or associated event data relates to World War II, the received data element may be saved as a new event if it comprises descriptions of a battle which occurred during World War II, such as the D-Day landings. The saved event data may additionally comprise a source reliability or trust score. The matching and/or associated event data is then sent to the server system 114.

The location module 122 is initiated by the server system 114 from which it receives a data element and queries a location database 108. A location similar to the received data element is selected and the received data element and the selected location data are compared to determine whether they match. The data element and location data match if it can be determined that the data describe the same location. If the data matches, the data are saved to the location database 108 as matching locations, that is that they described the same location or can be associated with each other, such as may be the case if the data element and the selected location comprise different levels of specificity, such as describing a city, such as Normandy, in a country in which it resides, France. The location module 122 checks whether there are more locations similar to the received data element. If there are more similar locations, another location is selected and the comparison process is repeated until there are no remaining similar locations. If there are no similar locations which match or can be associated with the received data element, the received data element may be saved to a location database 108 as a new location. The received data element may be saved as a new location even if it matches or is associated with one or more locations if the received data element is more specific than the matched or associated location data. For example, if the matched or associated event data describes Normandy France, the received data element may be saved as a new location if it comprises a more specific location, such as Omaha Beach. The saved location data may additionally comprise a source reliability or trust score. The matching and/or associated location data is then sent to the server system 114.

The perspective module 124 is initiated by the server system 114 and receives one or more perspective parameters describing a desired story to be generated. Each of the event database 106, location database 108, and subject database 110 are queried, in addition to any relevant optional databases and data relevant to the received perspective parameters are selected. Each of the selected data records are arranged chronologically and based upon physical locations. The aggregated data may comprise a story which may further comprise a part of a memorial. The aggregated data, which may comprise further ordering, is returned to the server system 114.

The memorial module 126 is initiated by the server system 114. The memorial module 126 identifies significant locations, objects, and events related to aggregated data from the perspective module 124 and one or more locations, objects, and/or times related to events, are selected as memorial parameters. Likewise, additional memorial parameters may be identified and selected. The aggregated data and memorial parameters are used to generate a memorial which is saved to a memorial database 112 and which is returned to the server system 114.

The display module 128 is initiated by the server system 114. The display module 128 receives a memorial detection request and queries a memorial database 112 to retrieve at least one memorial comprising memorial content and one or more memorial parameters. The presence of a memorial and/or memorial parameters are detected by one or more sensors 142 and/or cameras 140. The collected data is compared to the memorial parameters and if satisfied, the memorial may be accessed and/or viewed. A display status is returned to the server system 114.

Second system 130 can be a distributed network of computational and data storage resources which may be available via the internet or by a local network. A second system 130 accessible via the internet can be referred to as a public cloud, whereas a second system 130 on a local network can be referred to as a private cloud. Second system 130 may further be protected by encrypting data and requiring user authentication prior to accessing its resources.

A third party network 132 may comprise one or more network resources owned by another party. For example, a third party network 132 may refer to a service provider, such as those providing social networks such as Facebook or Twitter. Alternatively, a third party network 132 may refer to a news website or publication, a weather station, etc.

A third party database 134 may store data owned by another party. In some embodiments, the third party database 134 stores data on the third party network 132. For example, a third party database 134 may store data on a third party network 132, or may alternatively comprise archival data, historical accounts, survey results, customer feedback, social media posts, etc. In one embodiment, the third party database 134 may include, for example, World War II photos from the National Archives.

An IoT (Internet of Things) IoT data source 136 may be an internet connected device which may comprise one or more sensors 142 or other sources of data. IoT data sources 136 may comprise appliances, machines, and other devices, often operating independently, which may access data via the internet, a second system 130, or which may provide data to one or more internet connected devices or a second system 130.

A user device 138 is a computing device which may comprise any of a mobile phone, tablet, personal computer, smart glasses, audio, or video recorder, etc. In some embodiments, the user device 138 may include or be comprised of a virtual assistant. In other embodiments, a user device 138 may comprise the one or more cameras 140 and/or sensors 142. In some embodiments, the user device 138 may comprise a user interface for receiving data inputs from a user.

A camera 140 is an imaging device or sensor 142 that collects an array of light measurements which can be used to create an image. One or more measurements within the array of measurements can represent a pixel. In some embodiments, multiple measurements are averaged together to determine the value(s) to represent one pixel. In other embodiments, one measurement may be used to populate multiple pixels. The number of pixels depends on the resolution of the one or more sensors 142, comprising the dimensions of the array of measurements, or the resolution of the resulting image. In some embodiments, the resolution of the one or more cameras 140 or the one or more sensors 142 does not need to be the same as the resolution of the resulting image. In some embodiments, a camera 140 may be a component in a user device 138 such as a mobile phone, or alternatively may be a standalone device. In some embodiments, a camera 140 may be analog, where an image is imprinted on a film or other medium instead of measured as an array of light values.

A sensor 142 is a measurement device for quantifying at least one physical characteristic such as temperature, acceleration, orientation, sound level, light intensity, force, capacitance, etc. A sensor 142 may be integrated into a user device 138, such as an accelerometer in a mobile phone, or may be a standalone device. In some embodiments, a sensor 142 may also be found in an IoT data source 136 or a third party network 132.

FIG. 2 illustrates an exemplary source database 104. The source database 104 may store data relating to sources of data, and particularly an indication of the trustworthiness or reliability of the source. The source database 104 comprises a plurality of source layers, which may be, for example, Device ID, ownership of device (individual or organization), methods of recording (analog, digital, or some combination thereof), age (creation date), and movement through time and space (e.g., temporal and geographic location). The reliability of the source may be determined based upon analysis of one or more stories which may be attributed to the source and/or one or more objects which may be attributed to the source. A story is a data record which may be comprised of one or more objects, which are individual data elements. The source database 104 may be populated by a trust verification system. The source database 104 may be used by the server system 114, the data collection module 116, the subject module 118, the event module 120, the location module 122, the memorial module 126, and the display module 128.

FIG. 3 illustrates an exemplary event database 106. The event database 106 stores data related to time-based events such as those which comprise a time data reference. Event data may be associated with any significant moment, or any combination of actions in a physical or metaphysical space completed by a human, artificial intelligence (AI), or digital object. The event data may comprise at least one date and descriptions of one or more events which occurred on that date. The date may additionally comprise a time. The date may instead comprise a year, or a range of years, or alternatively a date range between two specific dates, weeks, months, times, etc. The event database 106 is populated by the data collection module 116 and is updated by the event module 120. The event database 106 may additionally be populated by one or more of the second system 130, the third party network 132, the third party database 134, IoT data source 136, user device 138, camera 140, or one or more sensors 142. The event database 106 is utilized by the event module 120 and the perspective module 124.

FIG. 4 illustrates an exemplary location database 108. The location database 108 stores data related to location-based data such as those which describe locations. The location data may comprise any of a continent, country, state, city, town, street, address, building, etc. Location related data may also comprise GPS coordinates, regions, including common names, as well as geographic features, such as mountains, valleys, canyons, rivers, streams, lakes, oceans, etc. The location database 108 is populated by the data collection module 116 and is updated by the location module 122. The location database 108 may additionally be populated by one or more of the second system 130, the third party network 132, the third party database 134, IoT data source 136, user device 138, camera 140, or one or more sensors 142. The event database 106 is utilized by the event module 120 and the perspective module 124.

FIG. 5 illustrates an exemplary subject database 110. The subject database 110 stores data related to people, animals, objects, etc. In some embodiments, the subject database 110 primarily describes people and characteristics describing them. The subject data may comprise descriptions of a person, groups and affiliations, and roles they may have fulfilled. In some embodiments, subjects may include any data which is categorical in nature, or any and all attributes of categories in the subject database 110. Examples may comprise job titles they have held, companies they have worked for, musical or theatrical groups with which they performed, military units with which they served and/or fought, etc. Additional data may comprise qualifications, talents, physical descriptions, etc. Subject data may be specific, such that it describes specific individuals, or may be more generalized, such that it describes a group of people, such as a musical group such as the Beatles, or a military unit, such as the US 16th infantry regiment in World War II. The subject database 110 is populated by the data collection module 116 and is updated by the subject module 118. The subject database 110 may additionally be populated by one or more of the second system 130, the third party network 132, the third party database 134, IoT data source 136, user device 138, camera 140, or one or more sensors 142. The event database 106 is utilized by the event module 120 and the perspective module 124.

FIG. 6 illustrates an exemplary memorial database 112. The memorial database 112 may store data related to memorial parameters. The memorial parameters may include a person, place, thing, or an event being memorialized. The memorial parameters may further comprise one or more locations where the memorial may be geolocated or times describing when the memorial may be accessible or alternatively may describe when the memorial is inaccessible. The memorial parameters may comprise display conditions which must be met for the memorials to be accessible. The display conditions may be specific to a person or a group of people. The groups of people may include spouse, children, friends, coworkers, etc. The memorial database 112 may include a time of comprising day, week, month, etc. and may have a varying length of availability or alternatively restriction. For example, a memorial may only be accessible during business hours. As another example, a memorial may only be accessible during daylight hours. Daylight hours may be a fixed time period from 6:00 am to 6:00 pm or may alternatively vary with the changing times of sunrise and sunset. Similarly, one or more locations may be specified where a memorial may be accessible. The memorials may be specific to a location, such as memorializing a person's wedding at the church where the decedent was married, or at a lake where they visited for a family vacation.

The memorial database 112 is updated by the memorial module 126. The memorial database 112 may additionally be populated by one or more of a second system 130, third party network 132, third party database 134, IoT data source 136, user device 138, cameras 140, or one or more sensors 142. The memorial database 112 is utilized by the memorial module 126 and the display module 128. The memorial database 112 may store data related to memorial parameters that can encompass subjective and emotional characteristics of a person, place, or thing. The parameters include not only objective attributes like time and location but also components that convey an emotional connection and personal sentiment. This may comprise various media such as images, videos, audio recordings, personal anecdotes, letters, diaries, and other forms of content that uniquely represent the emotions and shared experiences of the individual being memorialized. For example, the memorial database 112 may facilitate the aggregation of content documenting an individual's artistic process, warmth, creativity, and kindness, or elements that relate to specific personal or communal experiences or connections. These subjective and emotional parameters may be geolocated to enable access at specific locations meaningful to the individual or accessible at particular times such as anniversaries or specific daily hours reflecting a connection to the person's life or routines. Such memorial parameters may serve to create an authentic portrayal that contributes to the overall significance of the memorial to an individual or community viewing the memorial parameters, enhancing the connection and resonance with the memorialized subject.

The integration with various data sources, such as second system 130, third party network 132, third party database 134, IoT data source 136, user device 138, cameras 140, or one or more sensors 142, allows the memorial database 112 to offer a multifaceted and emotionally rich experience, tailoring the memorial's content to the specific relationship of the viewer to the individual, thereby enriching the memorial's overall impact and significance.

Figure 7:
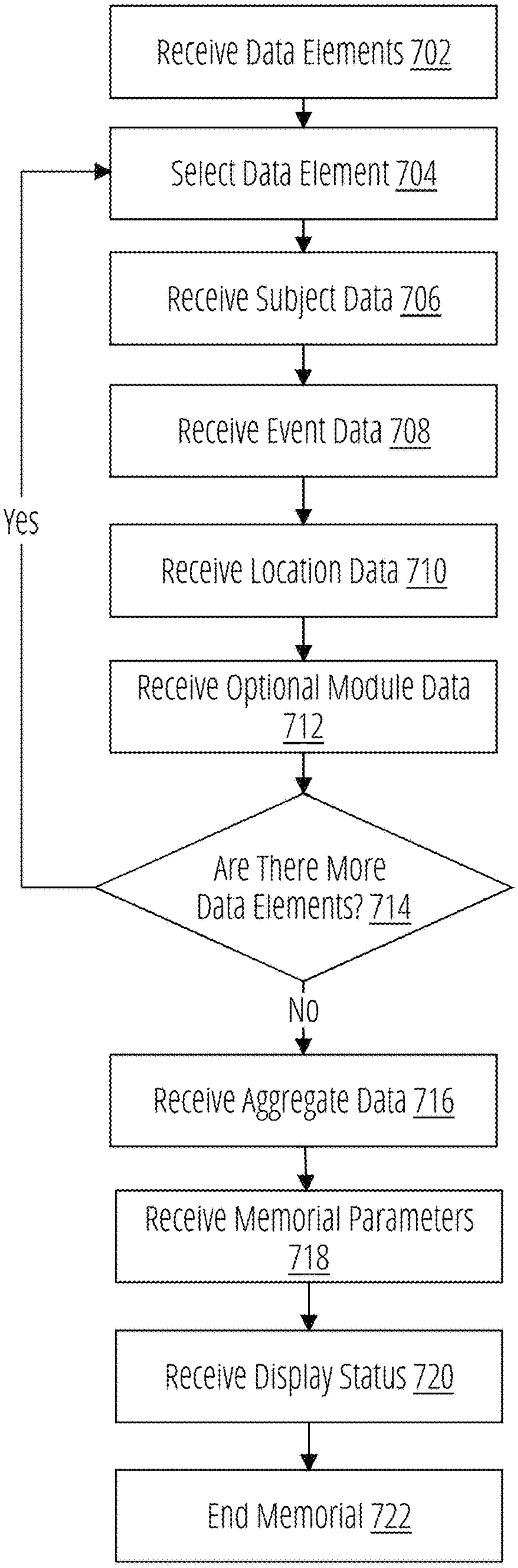
FIG. 7 is a flowchart illustrating an exemplary function of a server system.

FIG. 7 is a flowchart illustrating an exemplary function of the server system 114. The process begins with initiating the data collection module 116. The data collection module 116 receives data from at least one data source and identifies data elements comprising the received data such as discrete events, locations, people, items, etc. The data collection module 116 queries the source database 104, determines a source reliability score, saves event data to the event database 106, location data to the location database 108, and subject data to the subject database 110. The saved event data, location data, and subject data may additionally be accompanied by a source reliability score.

Server system 114 receives the identified data elements from the data collection module 116 at operation 702. For example, a data element may be a subject, a US soldier named John Smith who was a member of the 16th infantry regiment. A data element may be an event, such as the D-Day landings on Jun. 6, 1944. In another example, the data element may comprise location data such as coastline called Omaha Beach in Normandy, France. The data elements may additionally include names of other soldiers who may have participated in and/or been killed during the battle. The data elements may additionally comprise the equipment used, ammunition, etc.

Server system 114 selects, at operation 704, a data element from the at least one data element received from the data collection module 116. For example, server system 114 can select the soldier, John Smith. As another example, server system 114 can select the D-Day landings at Omaha Beach.

Server system 114 initiates the subject module 118, which receives data comprising at least one subject and querying the subject database 110, selects a subject similar to the received subject data, and determines whether the selected subject data matches the received subject data. If the data matches, server system 114 saves the received data as matching the selected subject to the subject database 110. If the subject data does not match, server system 114 checks whether there are more similar subjects. If there are more similar subjects, server system 114 selects another subject and determines whether the selected subject data matches the received subject data. If the received subject data does not match any data from the subject database 110, then server system 114 saves the received subject data as a new subject to the subject database 110.

Server system 114 receives, at operation 706, the subject data from the subject module 118. The subject data comprises matched subjects and/or newly identified subjects. Subjects may comprise people or things. Matching subjects are associated so as to add new details to an existing subject and/or corroborate existing details. Subject data may additionally be accompanied by a source score which indicates the reliability of the source. The reliability of the source may be retrieved from the source database 104 and/or may utilize a story corroboration system or other method of determining the reliability of the received data.

Server system 114 initiates the event module 120, which receives data comprises at least one event and querying the event database 106, selects an event similar to the received event data, and determines whether the selected event data matches the received event data. If the data matches, server system 114 saves the received data as matching the selected event data to the event database 106. If the event data does not match, server system 114 checks whether there are more similar events. If there are more similar events, then server system 114 selects another event and determines whether the selected event data matches the received event data. If the received event data does not match any data from the event database 106, then server system 114 saves the received event data as a new event to the event database 106.

Server system 114 receives, at operation 708, the event data from the event module 120. The event data comprises matched events and/or newly identified events. Events may comprise discrete or notable actions, or other time-based data. In some embodiments, an event may refer to something which occurred or the state of people, things, etc. at a specific date and/or time. The resolution of time may be one or more years, months, weeks, days, hours, minutes, seconds, etc. Matching events are associated so as to add new details to an existing event and/or corroborate existing details. Event data may additionally be accompanied by a source score which indicates the reliability of the source. The reliability of the source may be retrieved from the source database 104 and/or may utilize a story corroboration system or other method of determining the reliability of the received data.

Server system 114 initiates the location module 122, which receives data comprising at least one location and querying the location database 108, selects a location or location characteristic similar to the received location data, and determines whether the selected location data matches the received location data. If the data matches, server system 114 saves the received data as matching the selected location data to the location database 108. If the location data does not match, server system 114 checks whether there are more similar locations. If there are more similar locations, then server system 114 selects another location and determines whether the selected location data matches the received location data. If the received location data does not match any data from the location database 108, then server system 114 saves the received location data as a new location to the location database 108.

Server system 114 receives, at operation 710, the location data from the location module 122. The location data comprises matched locations and/or newly identified locations. Locations may describe countries, regions, cities, towns, villages, streets, buildings, etc. or may alternatively comprise a set of coordinates such as GPS or map coordinates. The resolution of location may comprise a distance or area of any scale ranging from inches or feet, millimeters or meters, to hundreds or thousands of miles or kilometers. In some embodiments, locations may be described by natural geographic features such as lakes, rivers, streams, mountains, valleys, canyons, etc. Matching locations are associated so as to add new details to an existing location and/or corroborate existing details. Location data may additionally be accompanied by a source score which indicates the reliability of the source. The reliability of the source may be retrieved from the source database 104 and/or may utilize a story corroboration system or other method of determining the reliability of the received data.

Server system 114 can initiate one or more optional modules, such as a migrations module, catastrophe module, war module, etc. which may operate similarly to the subject module 118, event module 120, and location module 122. The optional module(s) may query a relevant database and compare the selected data element to data stored in the relevant database(s) to identify matching data elements. The optional modules may compare specific data types beyond subject, event, or location data. For example, a migration module may compare data relating to the migration of people, animals, etc. This may include the nationality or ethnicity of people immigrating to or emigrating from a region or country, the number of people involved in the migration, etc. Likewise, the data may comprise a species of animal and number of animals involved in a migration between two locations. An optional module may be a catastrophe module which may compare data relating to natural or manmade disasters. Examples may be storms, such as those involving tornados, and may further include a track and severity of damage. Alternatively, a catastrophe module may compare details of a bridge collapse, train derailment, wildfire, etc. An optional module may further be a war module which may compare data specific to wars or other violent conflicts such as battle locations, casualties, military units involved, etc. The optional modules store the results of data comparisons to relevant databases, which may additionally include a source reliability score.

Server system 114 receives, at operation 712, data from the one or more operational modules, such as the migrations module, catastrophe module, war module, etc. The received data may further include a source reliability score.

Server system 114 checks, at operation 714, whether there are more data elements. If there are more data elements, then server system 114 returns to operation 704 and selects another data element. For example, there may be another data element comprising a description of a dog, therefore server system 114 returns to operation 706 and selects the data element comprising the description of the dog. In another example, there are no more data elements.

Server system 114 initiates the perspective module 124, which receives a perspective from the user. The perspective may comprise any one or more of a subject, event, location, etc. and should additionally comprise at least one user or person, or group of people, who may access and/or view a memorial. The perspective module 124 queries the event database 106, the location database 108, and the subject database 110 for data relating to the provided perspective. The related data is then used to create a timeline of events, a map of events, and may additionally summarize a plurality of perspectives such as from multiple subjects. For example, shared experiences between two or more individuals may be consolidated. In some embodiments, additional modules may be utilized to identify, match, and retrieve more specific types of data.

Server system 114 receives, at operation 716, the aggregate data from the perspective module 124. The aggregate data is assembled to form a story such as via a chronological account of events which may further be used and/or modified as a memorial. The aggregate data may comprise a plurality of accounts, which may be summarized from a plurality of subject, event, or location data. In some embodiments, the aggregate data may comprise generalizations or inferences from the available data. In other embodiments, the aggregate data may be more specific, such as a narrative describing the events surrounding the life of a man named John Smith, and more specifically, the shared experiences between John Smith and his wife Samantha Smith.

Server system 114 initiates the memorial module 126, which identifies significant locations, objects, and/or events related to the aggregated data from the perspective module 124 and selects one or more locations, objects, and/or times related to one or more events to associate with the memorial. The memorial module 126 further identifies and selects other memorial parameters and saves the selected memorial parameters to the memorial database 112.

Server system 114 receives, at operation 718, memorial parameters from the memorial module 126. The memorial parameters can include conditions, which when satisfied, allow a memorial to be accessed and/or viewed.

Server system 114 initiates the display module 128, which receives a memorial detection request and queries a memorial database 112 for one or more memorials. Sensors 142 are polled to detect the presence of a memorial and/or memorial parameter. The display module 128 determines whether the memorial parameters have been satisfied, and if satisfied, allowing the user to access and/or view the memorial.

Server system 114 receives, at operation 720, a display status from the display module 128. The display status may comprise the memorial viewed, or a status indicating that the memorial has been viewed. In some embodiments, the status may indicate that the memorial parameters have been satisfied but may not require or indicate that the memorial was accessed and/or viewed.

Server system 114 ends, at operation 722, the memorial generation, detection, and display process.

Figure 8:
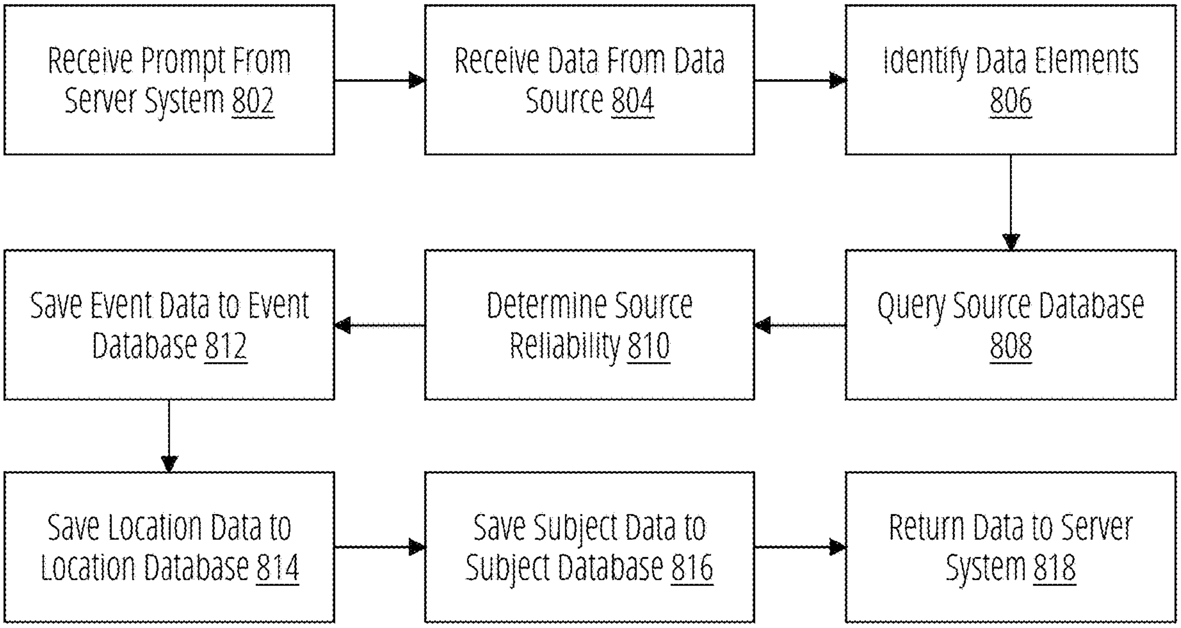
FIG. 8 is a flowchart illustrating an exemplary function of a data collection module.

FIG. 8 is a flowchart illustrating an exemplary function of the data collection module 116. The process begins with receiving, at operation 802, a prompt from the server system 114 to begin collecting data from at least one user and/or data source.

Operation 804 includes receiving data from at least one data source. In some embodiments, the data source may be a user using a user device 138. The user may manually input data via a physical or virtual keyboard interface or may alternatively dictate the input data verbally or upload one or more images taken by one or more cameras 140. The data source may alternatively be any of second system 130, third party network 132, third party database 134, IoT data source 136, camera 140, sensors 142, or a user device 138. The data collection may be passive, such as passively recording from a camera 140 or one or more sensors 142 which may include a microphone. The data collection may also comprise receiving data from remote sources, such as a second system 130, third party network 132, third party database 134, or an IoT data source 136. Likewise, a camera 140 may be one or more security cameras observing one or more individuals, locations, events, etc.

Operation 806 includes identifying at least one data element from the received data. A data element may comprise a data characteristic, such as a person, animal, object, location, time, event, etc. Data elements may be identified differently depending upon the format of the data associated with the story. For example, if the data is provided as text, a transcription, or an audio dialogue, the language may be analyzed, primarily segregating by nouns and verbs, and further evaluating whether each noun or verb references a discrete element. Nouns may indicate a person, animal, object, location, time, events, etc. whereas verbs may additionally refer to events. Alternatively, the data may be subjected to an algorithm or utilize machine learning and/or artificial intelligence to use methods such as a convolutional neural network to segregate the content into discrete elements while additionally accounting for context. Image and video may utilize image recognition to identify objects and object characteristics. In some embodiments, objects may be manually defined or refined. A data element may be a subject, a US soldier named John Smith who was a member of the 16th infantry regiment. A data element may be an event, such as the D-Day landings on Jun. 6, 1944. In another embodiment, the data element may comprise location data such as coastline called Omaha Beach in Normandy, France. The data elements may additionally include names of other soldiers who may have participated in and/or been killed during the battle. The data elements may additionally include the equipment used, ammunition, etc.

Operation 808 includes querying the source database 104 for a score indicating the reliability of the data source from which the data was received. The data score may be binary, indicating whether the data source is trustworthy or not. Alternatively, the data score may be a fixed scale, with several degrees of trust or reliability between a minimum and maximum value. In other embodiments, the data score may be numerical with no fixed scale. Likewise, the scale may comprise only positive values, or may additionally allow negative values. In some embodiments, the source reliability score is numerical and not on a fixed scale, and the larger the number, the more reliable the source.

Operation 810 includes determining the reliability of the source by retrieving a source score from the source database 104. For example, the source score for the current data source is 432. As another example, the source does not have a source score and therefore is assigned a default value of 100. In some embodiments, a story verification system is used to verify and corroborate the accuracy of the contributed story to determine the source reliability score.

Operation 812 includes saving identified event data to the event database 106. An example of event data may be the D-Day landings which occurred on Jun. 6, 1944. The event data may additionally comprise a source reliability score.

Operation 814 includes saving location data to the location database 108. An example of location data may be the location of the D-Day landings in Normandy, France, which may further include references to the beach names used by the allies, Utah, Omaha, Gold, Juno, and Sword. The location data may additionally comprise a source reliability score.

Operation 816 includes saving identified subject data to the subject database 110. An example of subject data may be a soldier of the 16th infantry regiment. The subject data may additionally comprise a source reliability score.

Operation 818 includes returning the data, and source reliability score(s) to the server system 114. In some embodiments, the data collection module may be generated, organized, categorized, interpreted, or otherwise modified by an artificial intelligence and/or machine learning algorithm, such as, for example, a large language model (LLM) which may be trained on large data sets to produce human-like story data based on one or more prompts from a user, a system, etc.

Figure 9:
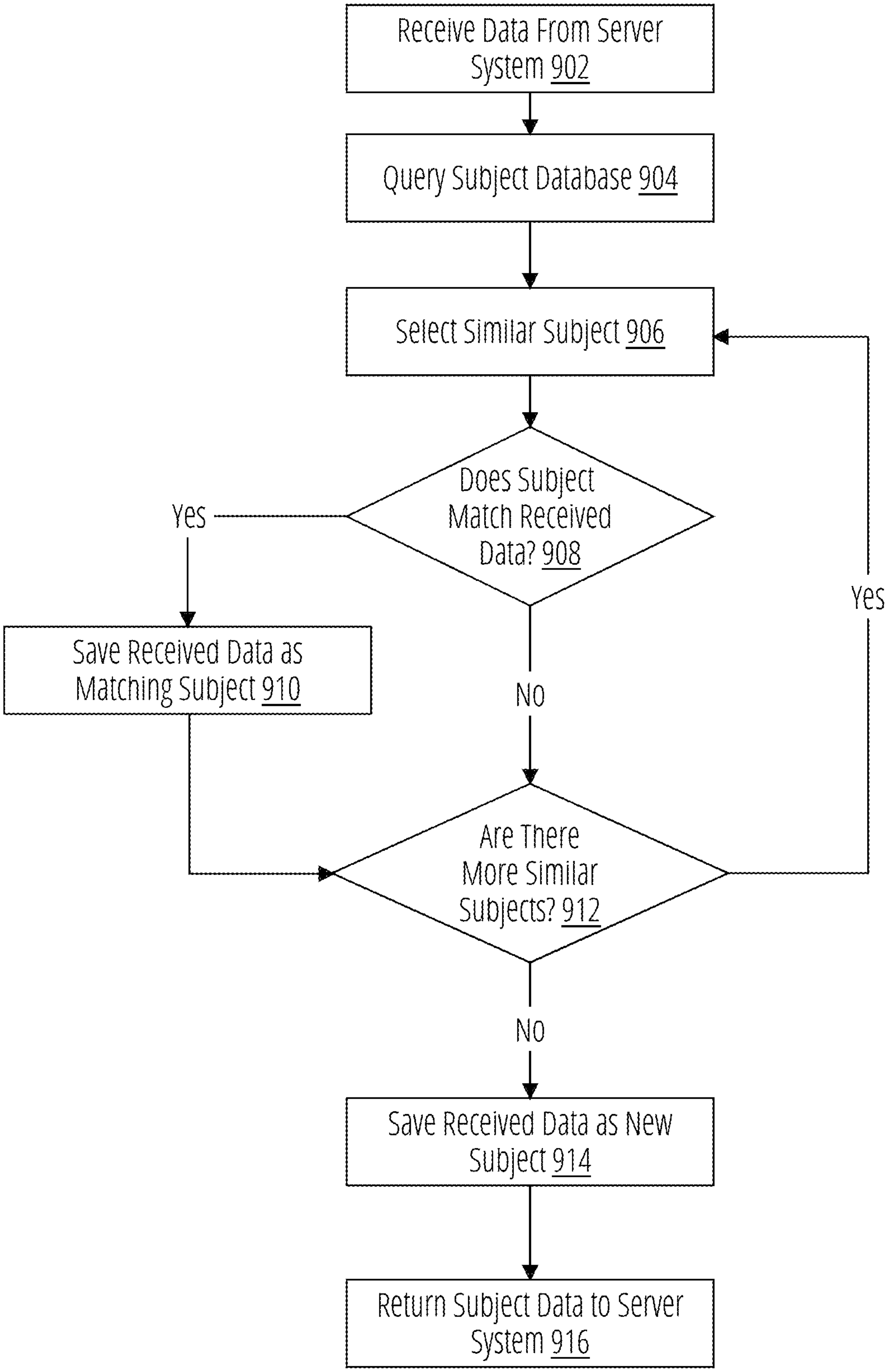
FIG. 9 is a flowchart illustrating an exemplary function of a subject module.

FIG. 9 is a flowchart illustrating an exemplary function of subject module 118. The process begins with receiving, at operation 902, data from the server system 114. The data comprises an identified data element which may include data elements representing subjects such as people, animals, objects, etc. The subject may be specific, such as a specific person, or may be more general, such as referring to all or any person matching a description, such as nationality, resident of a particular village, having blue eyes, brown hair, or wearing a green uniform, etc.

Operation 904 includes querying the subject database 110 for subject data which is similar to the received subject data. For example, if one of the received subject data elements comprises a description of a soldier, then query the subject database 110 for data related to soldiers. If the received subject data elements relate to a dog, then query the subject database 110 for data related to dogs.

Operation 906 includes selecting a subject from the subject database 110 similar to the received subject data. For example, the received data element may be a description of a soldier, therefore a subject describing the soldier is selected from the subject database 110.

Operation 908 includes determining whether the selected subject from the subject database 110 matches the description in the received subject data sufficient to confirm that both descriptions describe the same subject. For example, matching a specific soldier may require that the uniform is the same, as well as a name, which may be present on the uniform, and/or a description of the soldier including height, build, facial features, scars, etc. If the subjects do not match, then check if there are more similar subjects. For example, the received data describes an American soldier standing 5'10" with a name tag with the last name Smith, whereas the selected subject data describes a soldier standing 6'1" with a name tag with the last name Jones, therefore the selected subject does not match the received data. In some embodiments, the selected subject data matches the received data element. The data does not need to be an exact match but should not comprise any unresolved conflicts. For example, if the height is off by an inch, but all other descriptions match, there may be a discrepancy with the height approximation, but it may still be concluded that both descriptions reference the same individual. On the other hand, if the descriptions have a key detail which cannot be resolved, such as the name on a nametag, then the discrepancy cannot be resolved, unless the description included a statement that the individual was wearing another person's uniform or nametag. It should also be noted that a data match may either be exact or may be generalized or more relative. For example, in some embodiments the received data element may be evaluated for an exact match to a specific person, whereas in other embodiments, it may be more general, such as matching the description of an American soldier during World War II. In such embodiments, details such as a name tag may only be relevant if it is compared against a roster of enlisted American soldiers.

Operation 910 includes saving the received data as matching the selected data to the subject database 110. A source reliability score may additionally be determined and saved to the subject database 110 with the matched data.

Operation 912 includes checking whether there are more subjects from the subject database 110 which are similar to the received subject data. If there are more similar subjects, then return to operation 906 and select an additional subject. For example, an additional element may describe another soldier in a green uniform, therefore returning to operation 906, and selecting the subject describing the another soldier in the green uniform. In other examples, there might be no additional subjects similar to the received subject data.

Operation 914 includes saving the received data to the subject database 110 as a new subject if the received subject data does not match any existing data records from the subject database 110. A source reliability score may additionally be determined and saved to the subject database 110 with the new subject data. In some embodiments, the source reliability score may be a default value.

Operation 916 includes returning the subject data to the server system 114. The subject data may comprise the received subject data and/or the subject data from the subject database 110 to which it matched.

Figure 10:
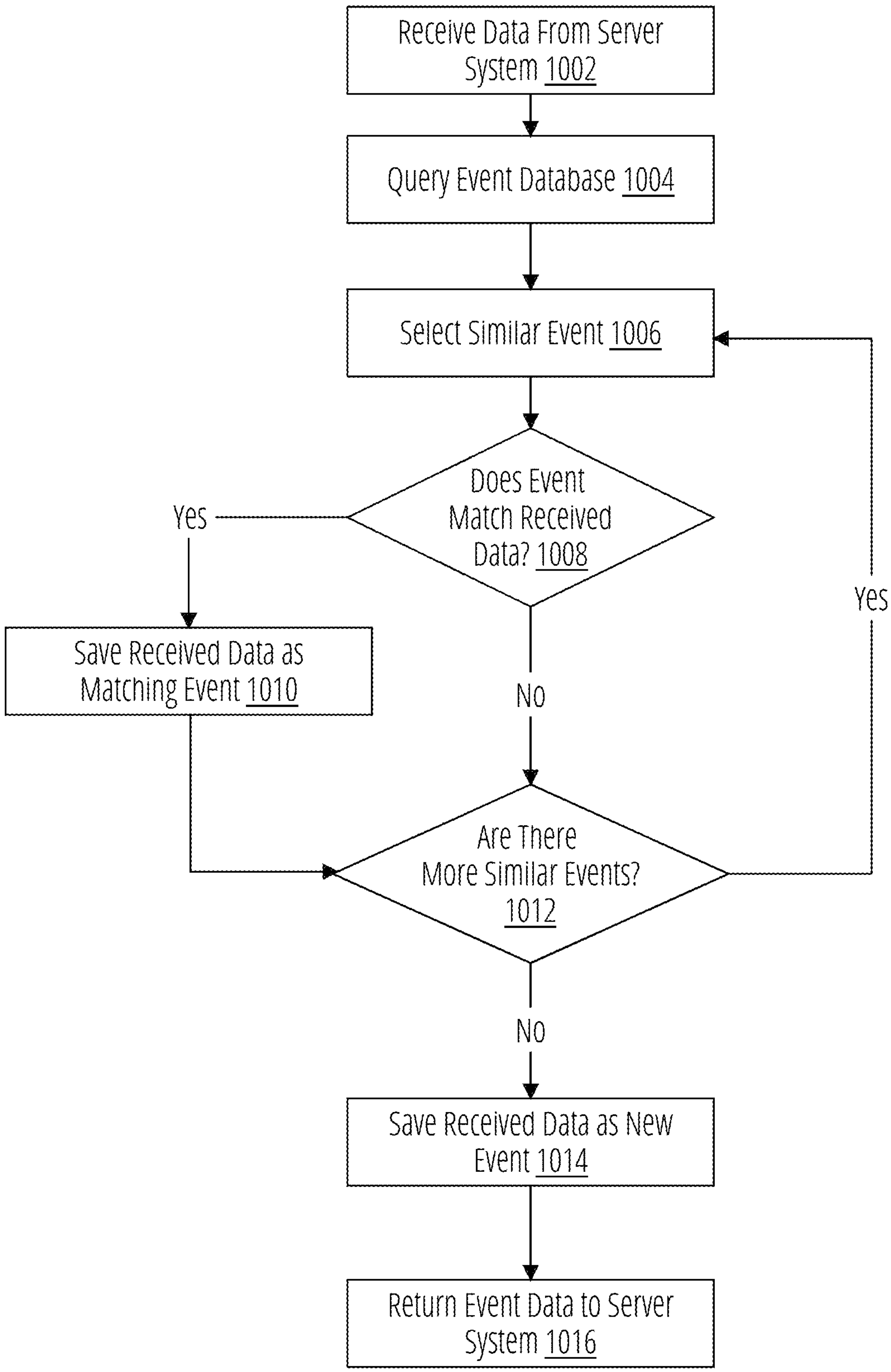
FIG. 10 is a flowchart illustrating an exemplary function of an event module.

FIG. 10 is a flowchart illustrating an exemplary function of event module 120. The process begins with receiving, at operation 1002, data from the server system 114. The data can include an identified data element which may include data elements representing events or time related data such as a date and/or time of death, birth, election, concert, parade, rocket launch, moon landing, invention, another type of event or point in time, a time period between any two events or points in time, or a combination thereof. The data may also comprise the start and/or end (and/or time in between) of a war, battle, pandemic, storm or other weather event, government policy, or another event that lasts an amount of time. The event data may be comprised any of a range of resolutions, such as a year, month, week, day, hour, minute, second, etc. and may further comprise a time period which may be segmented accordingly, such as the Middle Ages, common era (CE), before common era (BCE), Before Christ (BC), Anno Domini (AD), a certain century (e.g., $19^{th}$, $20^{th}$, $21^{st}$, $22^{nd}$, etc.), or another signifier of time period.

Operation 1004 includes querying the event database 106 for event data which is similar to the received event data. For example, if one of the received event data elements comprises a description of a battle during World War II, then query the event database 106 for data related to World War II battles. If the received event data elements relate to a weather event, such as a tornado, then query the event database 106 for data related to tornados.

Operation 1006 includes selecting an event from the event database 106 similar to the received data element. For example, the received data element can include a description of a battle during World War II, so an event describing the World War II battle is selected from the event database 106.

Operation 1008 includes determining whether the selected event from the event database 106 matches the description in the received data element sufficient to confirm that both descriptions describe the same event. For example, matching a World War II battle may comprise identifying the types of resources deployed, such as whether there were tanks deployed, or aircraft, and which units were deployed, such as specific infantry companies. If the events do not match, then check if there are more similar events. For example, the received data can describe a battle involving the amphibious landing of the US 16th infantry regiment and the selected event is the Normandy landings during World War II. The data is determined to be a match as the US 16th infantry regiment was a participant in the Normandy landings at Omaha Beach.

Operation 1010 includes saving the received data as matching the selected data to the event database 106. A source reliability score may additionally be determined and saved to the event database 106 with the matched data.

Operation 1012 includes checking whether there are more events from the event database 106 which are similar to the received data element. If there are more similar events, then return to operation 1006 and select an additional event. For example, an additional element describes an amphibious assault of an island in the Pacific Ocean, therefore returning to operation 1006 and selecting the event describing the amphibious assault of the island in the Pacific Ocean. In other examples, there may be no additional events similar to the received data element.

Operation 1014 includes saving the received data to the event database 106 as a new event if the received data element does not match any existing data records from the event database 106. A source reliability score may additionally be determined and saved to the event database 106 with the new event data. In some embodiments, the source reliability score may be a default value.

Operation 1016 includes returning the event data to the server system 114. The event data may comprise the received event data and/or the event data from the event subject database 110 to which it matched.

Figure 11:
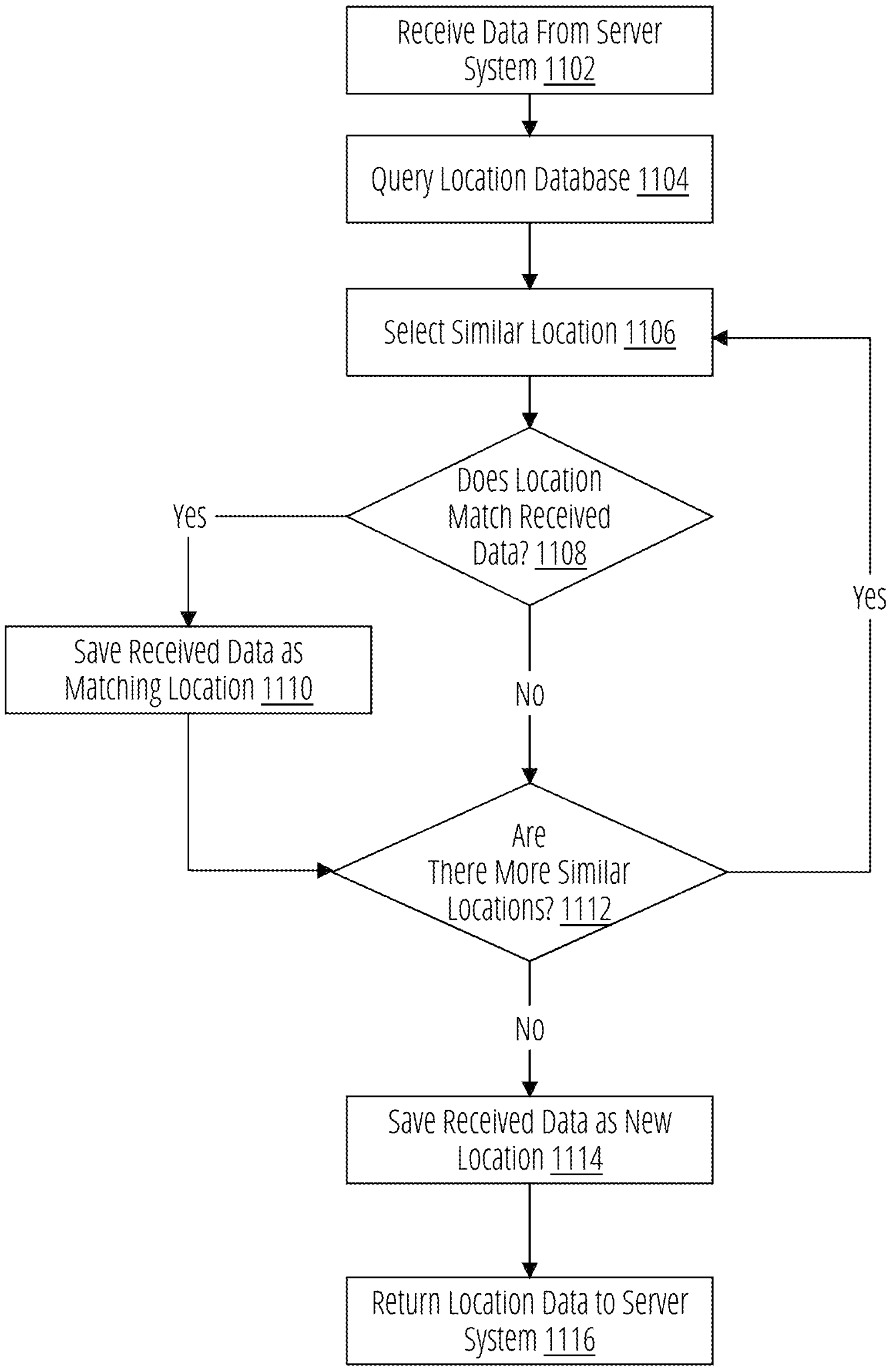
FIG. 11 is a flowchart illustrating an exemplary function of a location module.

FIG. 11 is a flowchart illustrating an exemplary function of location module 122. The process begins with receiving, at operation 1102, data from the server system 114. The data may include an identified data element which may include data elements representing locations such as countries, states, provinces, cities, towns, streets, buildings, GPS coordinates, etc. The location may alternatively refer to natural features such as a mountain, river, ocean, lake, etc. The location may be referred to by a plurality of names by different people.

Operation 1104 includes querying the location database 108 for location data which is similar to the received location data. For example, if one of the received event data elements comprises a description of a battlefield on the coast of France, then the location database 108 is queried for data related to coastal regions in France. The location database 108 may further refine the data query by, for example, specifying coastal regions where battles occurred.

Operation 1106 includes selecting a location from the location database 108 similar to the received location data. For example, the received data element may include a description of a battlefield on the coast of France, so a location describing coastal regions in France is selected from the location database 108. The coastal regions may be identifiable based upon names given to beaches, town or city names, or names assigned to operational regions used during one or more battles during one or more wars. For example, the beaches of Normandy, France may be selected.

Operation 1108 includes determining whether the selected location from the location database 108 matches the description in the received location data sufficient to confirm that both descriptions describe the same location. For example, matching a battlefield on the coast of France may include matching location names, GPS coordinates, physical landmarks, or descriptions of the terrain. If the location descriptions do not match, then more similar locations may be checked. For example, the received data may describe a battlefield on the coast of France, so the battlefield depicted in an image can be determined to match a region of the beaches of Normandy, France, specifically Omaha Beach.

Operation 1110 includes saving that the received location data matches the selected data to the location database 108. A source reliability score may additionally be determined and saved to the location database 108 with the matched data.

Operation 1112 includes checking whether there are more locations from the location database 108 which are similar to the received location data. If there are more similar locations, then return to operation 1106 and select an additional location. For example, an additional element may describe a location at 600 Independence Ave SW, Washington, DC, therefore returning to operation 1106 and selecting the location 600 Independence Ave SW, Washington, DC. In other examples, there may be no additional locations similar to the received location data.

Operation 1114 includes saving the received data to the location database 108 as a new location if the received location data does not match any existing data records from the location database 108. A source reliability score may additionally be determined and saved to the location database 108 with the new location data. In some embodiments, the source reliability score may be a default value.

Operation 1116 includes returning the location data to the server system 114. The location data may comprise the received location data and/or the location data from the location database 108 to which it matched.

Figure 12:
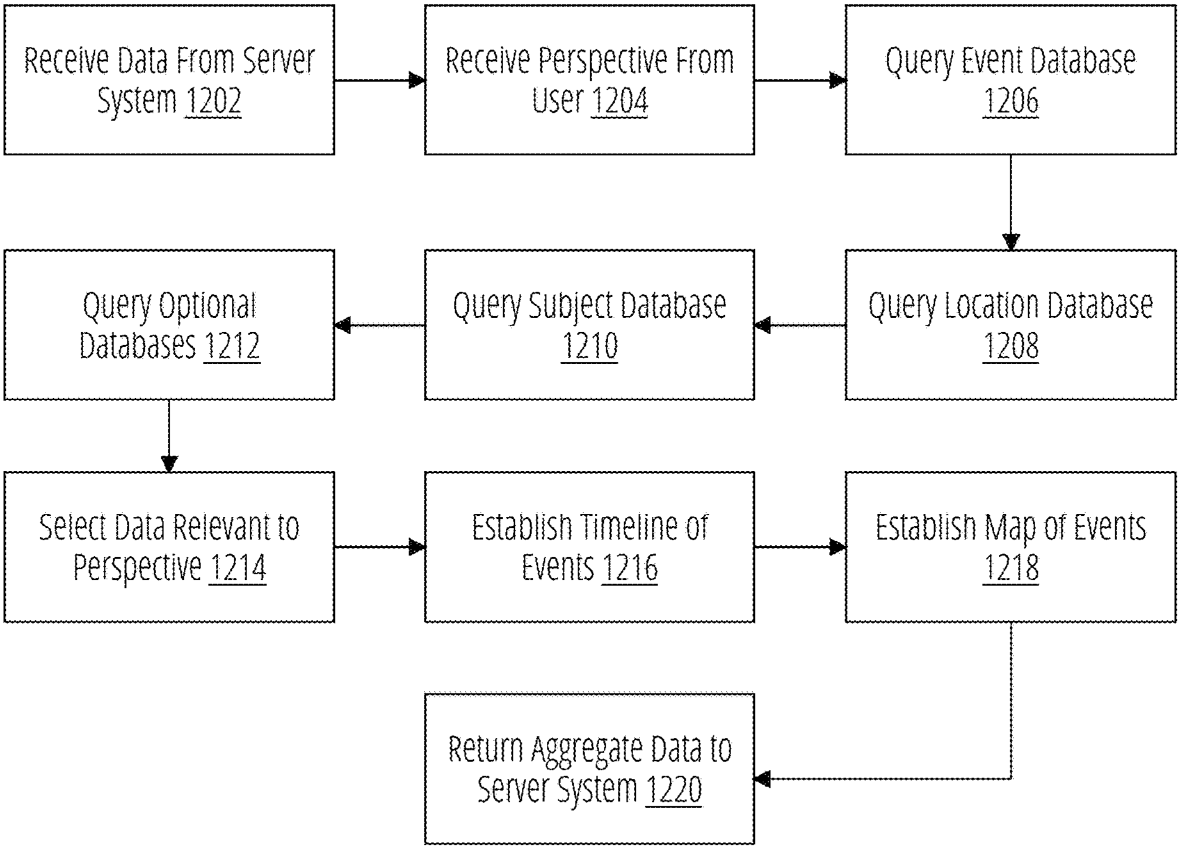
FIG. 12 is a flowchart illustrating an exemplary function of a perspective module.

FIG. 12 is a flowchart illustrating an exemplary function of perspective module 124. The process begins with receiving, at operation 1202, data from the server system 114. The data may include any of, subject, event, or location data. The received data may further comprise data from any additional optional modules.

Operation 1204 includes receiving a perspective from a user. A perspective may comprise query parameters describing a story about human history. For example, the perspective may relate to a person and/or, a location and/or an event. The perspective may further relate to a specific time period, a group of people, a location, etc. or any combination thereof. The perspective may comprise a plurality of descriptors, such as a US soldier during World War II. The level of requested detail may vary, such as relating not only to a US soldier, but a US soldier of the $16^{th}$ infantry regiment. It may further specify a soldier named John Smith. Likewise, the time detail may be general, encompassing a specific soldier's entire life, or may be specific to an event, such as World War II, or more specifically, the D-Day landings at Omaha Beach in Normandy, France. This may be further refined to comprise only the day of the landings or may be further expanded to include the time period from Jun. 6, 1944, until all five beaches targeted during Operation Overlord were connected on Jun. 12, 1944. Likewise, the perspective may relate to the location, including only the events which transpired at a specific location, such as at Normandy, France, or specifically the area designated as Omaha Beach. Additional information which may have been identified using optional modules, such as a war module, may also be referenced, such as including the deadliest battles of World War II, including only battles where more than 10,000 casualties were recorded on a single day, or where more than 100 tanks and/or planes were lost in a 24-hour period. For example, the perspective may include one or more subjects or people, or groups of people, who may access and/or view a memorial which may further comprise one or more relationships or memorial parameters. As another example, the perspective may include Samantha Smith, the widow of John Smith. Alternatively, a group of people may be friends. Likewise, memorial parameters may include that a perspective for John Smith's widow should include personal memories related to their wedding, family trips, etc., whereas the perspective for friends may omit personal memories including events such as John Smith's wedding, family trips and events, etc. but instead may include public accomplishments and professional achievements.

Operation 1206 includes querying the event database 106 for time-based data related to the perspective received from the user. For example, if the perspective relates to military service members who served with John Smith during World War II, then retrieving data relating to the D-Day landings at Normandy on Jun. 6, 1944. The data may comprise the start and end time of Operation Overlord, when a specific unit, such as the United States' 16th infantry regiment made landfall, or when events occurred during the landing, such as when a specific person was wounded or killed. For example, the data retrieved may relate to life events of John Smith and his widow, Samantha Smith, such as their wedding, anniversaries, birthdays, family trips, etc.

Operation 1208 includes querying the location database 108 for location-based data related to the perspective received from the user. For example, retrieving data related to the church where John and Samantha Smith were married. Further examples may comprise locations where a person being memorialized may have lived, worked, visited, etc. In some embodiments, a place or event may be memorialized, such as a building which may have once been a theater, or the location of a battle, such as the beaches of Normandy, France. The details may also comprise information about the terrain, physical landmarks, high and low tide marks, etc.

Operation 1210 includes querying the subject database 110 for subject-based data related to the perspective received from the user. For example, retrieving data related to soldiers of the 16th infantry regiment, and/or specifically a soldier named John Smith. The subject data may comprise information related to an individual being memorialized or may comprise information related to the perspective(s) of anyone who may access and/or view the memorial.

Operation 1212 includes querying one or more optional databases which may store data relevant to the perspective received from the user, such as details relating to the casualties of the D-Day landings, equipment used, amount of ammunition and other resources consumed, etc. Additional relevant data may comprise strategic analysis of the events, subjects, and/or location by expert sources. Optional databases may further comprise data from specific events, such as a musician's concert, documenting a theater's history including schedule of events, etc.

Operation 1214 includes selecting data relevant to the perspective received from the user. The data selection may include the use of an application of search criteria to filter the data. Alternatively, an algorithm may be used to identify the most relevant data and filter out irrelevant or less relevant data. Further, an algorithm may comprise a machine learning model including but not limited to a language model such as a generative pre-trained transformer. In some embodiments, a perspective may be determined, and a memorial generated, without any user data, or without receiving data from a user specifically to generate a memorial.

Operation 1216 includes establishing a chronological timeline of relevant events from the data selected in response to the perspective received from a user. The timeline allows each data reference to be referenced in the order in which the details it describes occurred or are relevant to a story relating to the perspective. A memorial may be comprised of one or more stories. A memorial may be comprised of a series of stories, which may be memories, which may be chronological. In other embodiments, a memorial may be organized in a manner differently than chronologically, such as following a theme, or using random or pseudorandom to achieve an abstract arrangement.

Operation 1218 includes establishing a map of relevant locations from the data selected in response to the perspective received from a user. The map allows each data reference which can be associated with a location to be referenced relative to other data references to describe a physical space, either by generating a virtual representation of the location(s), compile a collection or composite of relevant images, or to create a description of relevant locations. In some examples, a map may comprise a VR representation of a location, such as the interior of a church where a couple were married. Stories, some of which may include memories, may be arranged and referenced geographically based on where they occurred and/or were relevant. For example, referencing the birth of a child at a farmhouse where the birth occurred. Alternatively, referencing a high school graduation at the location where the high school stands or stood. The map may include aggregated data from a plurality of data sources such as individual accounts made by a plurality of people. The map may further include data from third party networks 132 and/or third party databases 134, such as from social media platforms.

Operation 1220 includes returning the aggregated data to the server system 114. The aggregated data can include the components of a story and/or memories and being organized at least by one or more of time and/or location. For example, the aggregated data can include a narrative about a man named John Smith, a soldier of the United States' 16th infantry regiment who met his future wife in Normandy, France during the final days of World War II.

Figure 13:
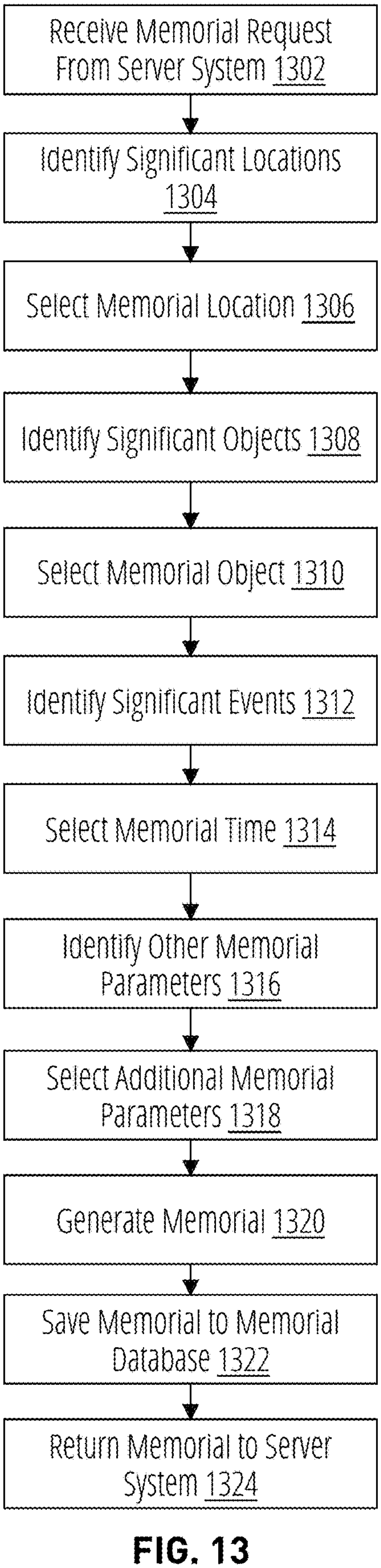
FIG. 13 is a flowchart illustrating an exemplary function of a memorial module.

FIG. 13 is a flowchart illustrating an exemplary function of memorial module 126. The process begins with receiving at operation 1302, a memorial request from the server system 114. The memorial request may comprise a perspective and data related to the perspective such as a person or object being memorialized and/or one or more people who may access and/or view the memorial. Additional data may relate to when and/or where the memorial may be accessed. In some other embodiments, the data may include a preferred format, such as, an interactive AI version of the person or object, a video, audio recording, pictures, text, etc. of the person, place, thing, event, etc. It may be noted that the person, place, thing, etc. may be deceased or no longer existent, or may alternatively be living, or may exist in a state different than the original state being memorialized.

Operation 1304 includes identifying one or more significant locations relevant to the receive perspective data. Examples of significant locations may include a location of birth, location of death, where the person being memorialized went to school, was married, lived, studied, etc. Significant locations may correspond to life events or places which the individual being memorialized, or one or more people who will access and/or view the memorial may have identified as being significant, such as locations where a birthday party was held, or of a family vacation, etc. In some embodiments, the significant location may relate to functional areas of an event being memorialized, such as on the grounds of a festival. Some such areas may include a stage, VIP lounge, green room, vendor booths, etc. Likewise, an object, may be memorialized, such as an old, covered bridge, which may have been destroyed by a flood, replaced due to deterioration, moved to a museum, etc.

Operation 1306 includes selecting a memorial location from the significant locations. For example, the selected location is the church where John and Samantha Smith were married.

Operation 1308 includes identifying one or more significant objects relevant to the receive perspective data. Examples of significant objects may include a chair, cane, vehicle, house, tool, etc. Significant objects may correspond to life events, hobbies, achievements, etc. which the individual being memorialized, or one or more people who will access and/or view the memorial, may have identified as being significant, or which represent common themes in stories or accounts from the person being memorialized and/or people who will access and/or view the memorial. In some embodiments, the significant object may be an item associated with the person being memorialized, like a specific cane they would use, or a tic they would always wear. Likewise, an object itself may be memorialized, such as an old, covered bridge, which may have been destroyed by a flood, replaced due to deterioration, moved to a museum, etc.

Operation 1310 includes selecting an object for inclusion as a memorial parameter from the identified significant objects. Selection of an object as a memorial parameter may be optional. Where an object is selected as a memorial parameter, a memory may be accessed when a person is in proximity to, or looking at, the object. For example, a user wearing an augmented reality headset may look at a cane which was used by John Smith such that when the user looks at the cane, a camera 140 on the augmented reality headset captures an image of the cane, which is confirmed to match the can used by John Smith by corroborating details, such as decorative patterns, damage, size, style, name tags, etc. An object may alternatively be any of an article of clothing, gifted object received by the deceased or received from the deceased. In some embodiments, the object may be the subject of the memorial, such as if an object is no longer in its former state, such as if it is now broken or has been destroyed.

Operation 1312 includes identifying significant events, relevant to the receive perspective data. Examples of significant events may include a date of birth or death, life events such as a graduation, marriage, birth of a child, anniversary, birthdays, vacations, career events such as beginning a new job, receiving a promotion, leaving a job, etc. Significant events may comprise a time component, such as a date or range of dates. The time period may be of any resolution, such as a single day, a range of days, weeks, months, years, or may alternatively be as specific as an hour, minute, second, etc. In some embodiments, significant events are life events or places which the individual being memorialized, or one or more people who will access and/or view the memorial may have identified as being significant. In some embodiments, the significant event may be a memory, such as the gifting of a cane to John Smith by his wife, Samantha Smith, on his $70^{th}$ birthday. In some embodiments, the events may further include dreams or other events that may have not physically occurred in the real world. For example, John Smith may have dreamed of going on a honeymoon to Bali with his wife, despite never traveling to Bali. These dreams may similarly be significant despite not physically occurring in the real world. Similarly, dreams or goals, both fulfilled and unfulfilled, may be memorialized. Connections can be drawn between dreams and the real world. For example, the imaginary honeymoon can be connected or otherwise associated with John Smith and his wife.

Operation 1314 includes selecting a time corresponding to a significant event. The selected time, or period of time, may indicate when the memorial may be accessible to be viewed by one or more people. In some embodiments, the selected time period may be a minute, a day, a week, or a month, etc. The selected time may be optional. The selected time may alternatively represent when to make a memorial inaccessible, such that it would otherwise be accessible, such as if an individual wished not to remember a person, place, thing, event, etc. at a specific time, such as during a wedding. The selected time may further include a repetitive element, such as daily, weekly monthly, annually, etc. For example, a user may receive a notification to view a memorial of their deceased dog every morning at 8:00 am when they would have taken a walk. In another example, a memorial for John Smith may be viewable on the anniversary of his death and/or his birthday. In some embodiments, the selected time may further comprise a start and/or end date.

Operation 1316 includes identifying other memorial parameters, relevant to the perspective data. Other parameters may include information, such as formats for the memorial to be prepared in such as video, audio, images, virtual reality, augmented reality, etc. Likewise, other parameters may modify a previously selected memorial parameter such as determining the proximity to the selected location(s) where the memorial will be accessible, duration of time the memorial is accessible, or depending on the media format, how much content to prepare. The other memorial parameters may further determine who may or may not access the memorial, such as to maintain appropriate privacy of the collected information. Other memorial parameters may also refer to methods of interacting with a memorial, or additional conditions for accessing a memorial such as restricting access to users with a specific brand of user device 138 or a specific measurement from a sensor 142.

Operation 1318 includes selecting additional memorial parameters. For example, the additional memorial parameters may include a video format, the video to last 5 minutes, and the video to be played when a user device 138 registered to Samantha Smith is within 500 feet of the church where she married John Smith.

Operation 1320 includes generating a memorial. The memorial may be generated using the perspective data and one or more selected memorial parameters. The memorial parameters may comprise the conditions to view and interact with the memorial and/or determine the format, duration, and other characteristics of the memorial. For example, a memorial may be generated comprising a 5-minute video of shared life events between John Smith and his widow Samantha Smith. The video may include images and may include music, audio recordings, etc. Some music, images, sound effects, etc. may be accessed from a third party network 132 and/or third party database 134 to generate the memorial in combination with SIO data. At operation 1320, the process of generating a memorial involves the utilization of natural language generation (NLG) as one approach to create a cohesive and meaningful narrative. Based on the received perspective data related to the person being memorialized, such as John Smith, and the selected memorial parameters including significant locations, objects, events, and additional memorial parameters, the NLG algorithm operates to generate a memorial. Within this context, the NLG algorithm retrieves relevant data, which may include facts such as John Smith's birth date, enlistment in the Army, assignment to the 16th Infantry Regiment, landing on Omaha Beach as part of the D-Day invasion, receiving a Purple Heart, and marriage to Jane Doe. These factual data points serve as input for the NLG algorithm, which constructs a narrative story summarizing John Smith's wartime experiences and relationship with Jane Doe. The NLG algorithm determines the structure and flow of the story by sequencing the events, choosing descriptive wording without unnecessary adjectives, and adding appropriate transition phrases to create a seamless narrative. The generated story might be: "John Smith was born in 1920 and enlisted in the Army in 1941. As part of the 16th Infantry Regiment, he landed on Omaha Beach in Normandy France on Jun. 6, 1944—a day that would be remembered as D-Day. Smith bravely fought alongside his comrades and helped achieve victory, but not before being wounded in action and receiving a Purple Heart. After returning home from the war, Smith married his sweetheart Jane Doe on Aug. 15, 1945. Though his war experiences had changed him, Smith found happiness and meaning through starting a new life with his wife." The memorial module then takes this generated story, aligning it with key events and locations, to create a customized memorial for John Smith. This NLG approach enables the crafting of compelling narratives from factual data about a person, tailored for memorialization purposes. For example, the memorial may be generated as a 5-minute video of shared life events between John Smith and his widow Samantha Smith, including images, music, and audio recordings, accessible when a user device registered to Samantha Smith is within proximity to a significant location like the church where they were married. Some content, such as music or images, may be accessed from third-party networks or databases to enhance the memorial. By employing NLG in this manner, the memorial offers an emotionally rich and authentic portrayal that reflects the significance of John Smith's life and relationships, thereby enriching the memorial's overall impact and significance.

Operation 1322 includes saving the generated memorial to the memorial database 112.

Operation 1324 includes returning the generated memorial to the server system 114.

Figure 14:
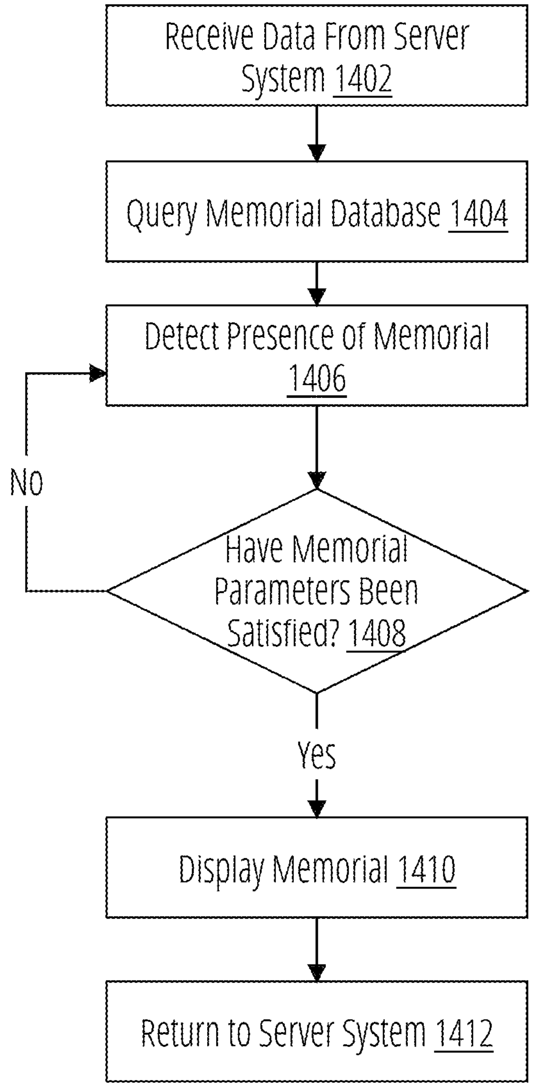
FIG. 14 is a flowchart illustrating an exemplary function of a display module.

FIG. 14 illustrates an exemplary function of display module 128. The process begins with receiving at operation 1402, a memorial detection request. The memorial detection request may comprise running an application on a user device 138 which accesses and/or views memorials. Alternatively, the memorial detection request may comprise monitoring of an area for a user device 138. Alternatively, a memorial detection request may be a scheduler which monitors time and provides notifications and/or access to memorials based upon a schedule. A memorial detection request may operate on a user device 138, in a second system 130, or in a discrete system such as a single board computer which may operate as a beacon or geocache.

Operation 1404 includes querying the memorial database 112 for a memorial and memorial parameters comprising the conditions which must be satisfied to allow access to or to view the memorial.

Operation 1406 includes detecting the presence of a memorial. Detection of the presence of a memorial comprises polling one or more sensors 142 and/or cameras 140 for data corresponding to one or more memorial parameters. For example, the location of a user device 138 registered to a specific user can be polled from a global positioning system (GPS) sensor. In another example, a clock is polled for the current time. As another example, one or more images are received from one or more cameras 140 and image recognition is used to match the objects in the images to a memorial parameter, such as a cane belonging to John Smith.

Operation 1408 includes determining whether memorial parameters have been satisfied. A memorial is detected if the memorial parameters are satisfied. Examples of memorial parameters being satisfied may include being within a geographic area as determined by GPS coordinates and/or proximity to a Bluetooth beacon or other transmitter, time, proximity to an object, etc. For example, the widow of John Smith, Samantha, being within 500 ft of the church where they were married, satisfying the memorial parameter comprising the church. In another example, a cane belonging to John Smith is within the vision of his widow, Samantha, satisfying the memorial parameter corresponding with proximity to the cane. In some embodiments, a plurality of memorial parameters may need to be satisfied, such as location and time. In other embodiments, satisfying memorial parameters may comprise confirmation of the absence of a condition, such as when a memorial is unavailable during a specific time period. If the memorial parameters have not been satisfied, return to operation 1406 and continue to detect the presence of a memorial.

Operation 1410 includes displaying the memorial when the memorial parameters have been satisfied. For example, displaying a 5-minute video comprising shared experiences between John Smith and his widow, Samantha Smith, when Samantha is within 500 feet of the church where they were married. The memorial may be in the form of a video, image, audio, augmented reality, virtual reality, text, etc. The memorial may be accessed and/or viewed via a user device 138 which may comprise any of a mobile device, augmented reality or virtual reality device, or may comprise a kiosk or terminal which may include proprietary designs. In some embodiments, the displayed memorial may be presented in multiple forms, such as, an interactive AI version of the person or object, a video or an audio or pictures or text of the person or object.

Operation 1412 includes returning the accessed and/or viewed memorial to the server system 114.

Figure 15:
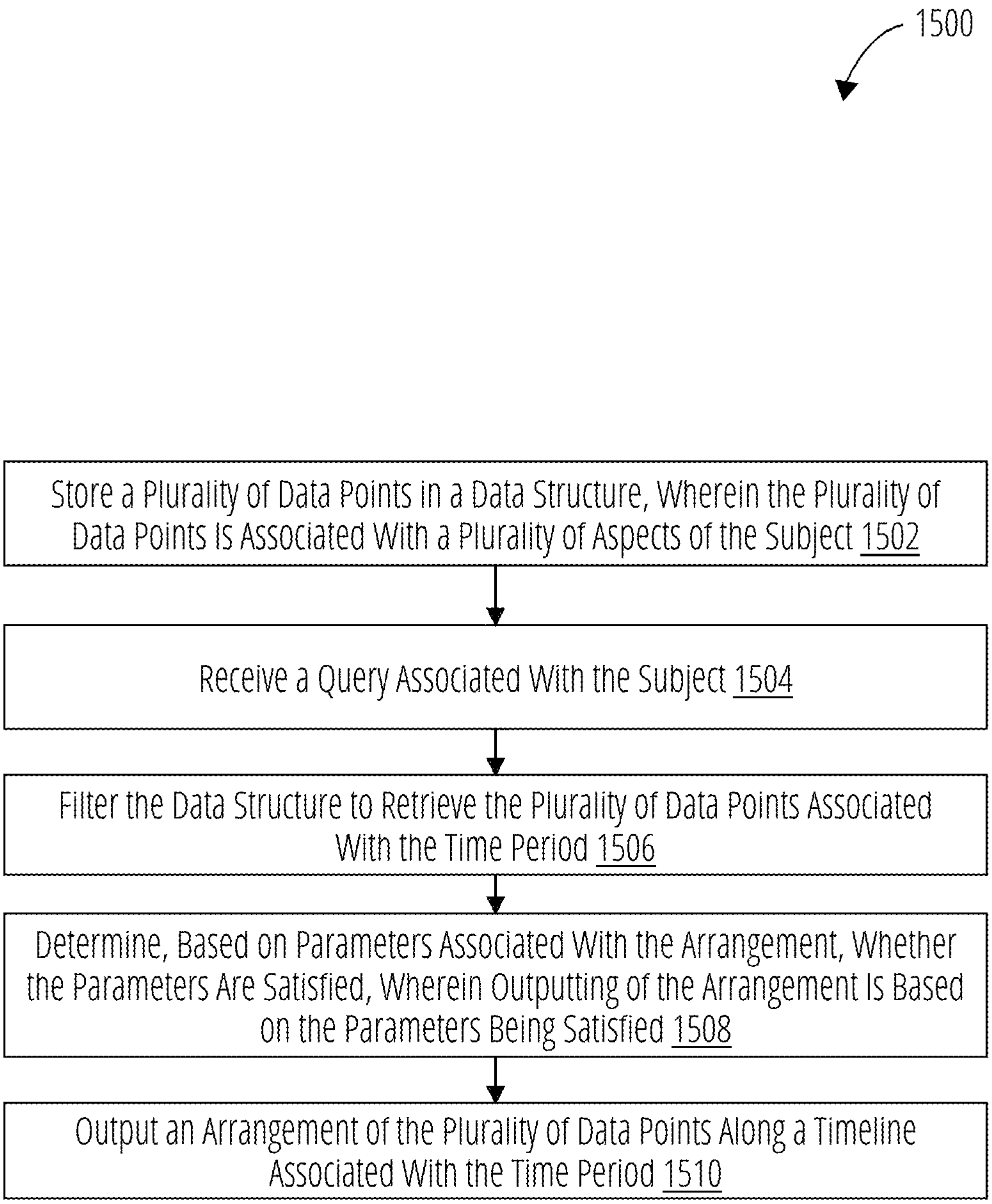
FIG. 15 illustrates a process for generating an arrangement memorializing a time period associated with a subject.

FIG. 15 is a flowchart illustrating an example of a process 1500 for generating an arrangement memorializing a time period associated with a subject. The process is performed by using a story generation system, which may include, for instance, first system 102, server system 114, second system 130, user device 138, system(s) that perform any of the process(es) illustrated in the flowcharts of FIGS. 6-12, a computing system and/or computing device with at least one processor performing instructions stored in at least one memory (and/or in a non-transitory computer-readable storage medium), a system, and apparatus, or a combination thereof.

At operation 1502, a story generation system stores a plurality of data points in a data structure, wherein the plurality of data points is associated with a plurality of aspects of the subject. In some embodiments, the plurality of aspects includes at least one of a person, an object, a place, or an event that is associated with the subject. In some embodiments, the subject is one of a person, an event, or a place. Examples of the plurality of data points can include the data elements of FIG. 7, the subject data of operation 706, the event data of operation 708, the location data of operation 710, the optional module data of operation 712, the aggregate data of operation 716, the data elements of operation 806, the data from FIG. 12, the events in FIG. 13, and other data points discussed herein, or a combination thereof.

At operation 1504, the story generation system receives a query associated with the subject. For example, a user may wish to see the complete narrative history of an object or product.

At operation 1506, the story generation system filters the data structure to retrieve the plurality of data points associated with the time period. In some examples, the data filtering and retrieval is based on a search criteria. For example, a user may deploy a search criteria based on specific requirements. For example, a consumer may wish to see the complete narrative history of an object or product in any possible views limited to publicly available information only. In some examples, the data filtering and retrieval is based on an algorithm that identifies the most relevant data and filters out irrelevant or less relevant data. In some examples, the algorithm may be performed and/or generated by a machine learning model. For example, an algorithm generated by a ML system 1600 may filter less relevant data based on inputs (e.g., narrative history of an object that is publicly available) and output relevant data.

At operation 1508, the story generation system determines, based on parameters associated with an arrangement of the plurality of data points along a timeline associated with the time period, whether the parameters are satisfied, wherein outputting of the arrangement is based on the parameters being satisfied. In some examples, the arrangement is a visualization of the plurality of data points. The parameters can include parameters selected for use by first system 102, the memorial parameters of memorial database 112 and/or used by memorial module 126, perspective parameters used by perspective module 124, etc. In some examples, the parameters include a distance parameter, wherein the distance parameter is satisfied based on proximity to a specified location. For example, the arrangement may only be output when Samantha Smith is within 500 feet of a church where she and John Smith were married. In some examples, the parameters include a temporal parameter, wherein the temporal parameter is satisfied based on a time of access of the arrangement. For example, the arrangement may only be output during business hours.

At operation 1510, the story generation system outputs the arrangement of the plurality of data points along the timeline associated with the time period. In some examples, the plurality of data points include audio and visual data and the arrangement can output audio and visuals based on the audio and visual data. For example, the arrangement may be a video including images and music, audio recordings, etc.

Figure 16:
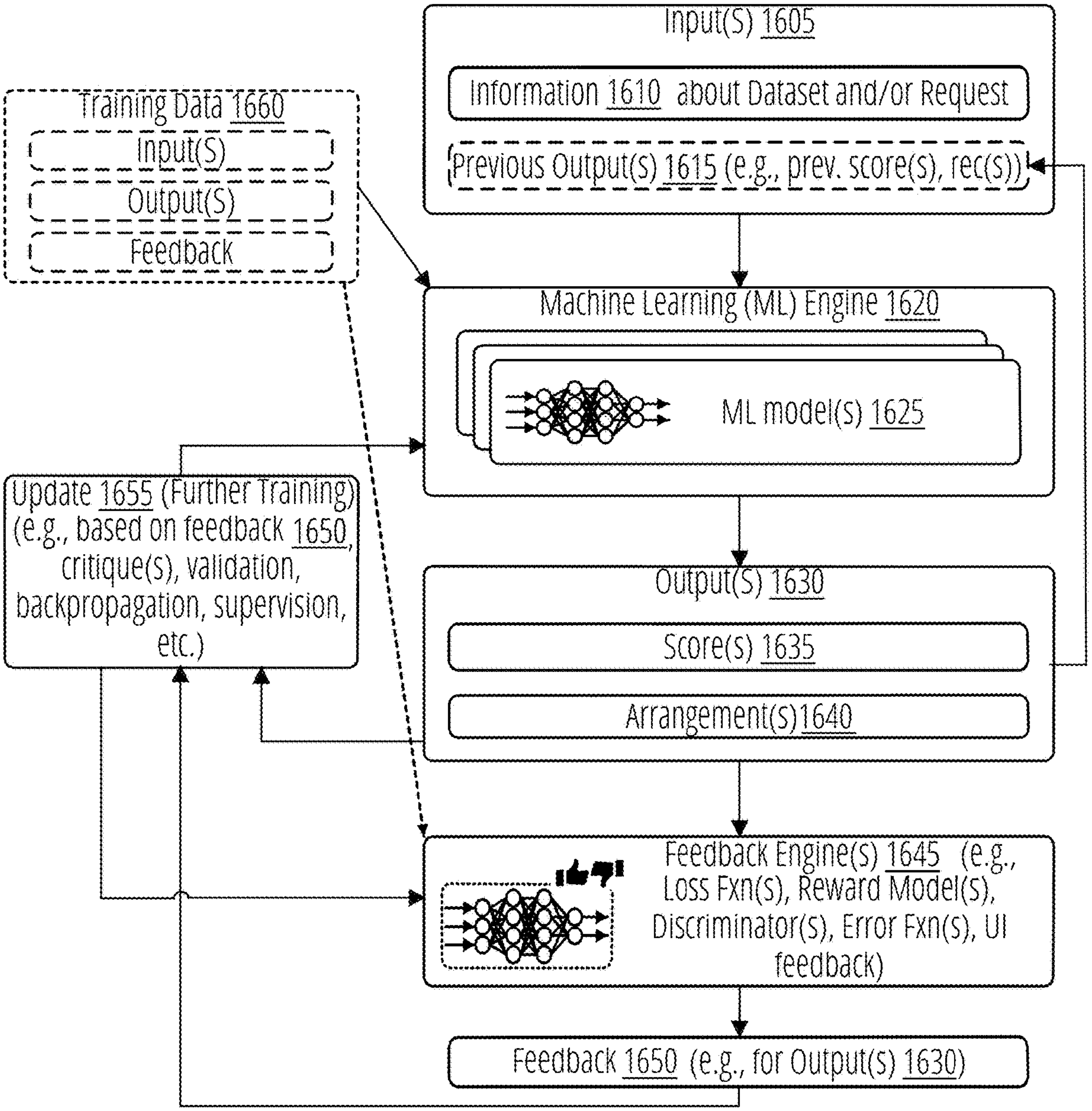
FIG. 16 is a block diagram illustrating an example of a machine learning system.

FIG. 16 is a block diagram illustrating an example of a machine learning (ML) system 1600 for training, use of, and/or updating of one or more machine learning model(s) 1625 that are used to generate score(s) 1635 and/or arrangement(s) 1640. The ML system 1600 includes an ML engine 1620 that generates, trains, uses, and/or updates one or more ML model(s) 1625. In some examples, vehicle story generation system, first system 102, second system 130, and/or server system 114 include the ML system 1600, the ML engine 1620, the ML model(s) 1625, and/or the feedback engine(s) 1645, or vice versa.

The ML model(s) 1625 can include, for instance, one or more neural network(s) (NN(s)), one or more convolutional NN(s) (CNN(s)), one or more time delay NN(s) (TDNN(s)), one or more deep network(s) (DN(s)), one or more autoencoder(s) (AE(s)), one or more variational autoencoder(s) (VAE(s)), one or more deep belief net(s) (DBN(s)), one or more recurrent NN(s) (RNN(s)), one or more generative adversarial network(s) (GAN(s)), one or more conditional GAN(s) (cGAN(s)), one or more feed-forward network(s), one or more network(s) having fully connected layers, one or more support vector machine(s) (SVM(s)), one or more random forest(s) (RF), one or more computer vision (CV) system(s), one or more autoregressive (AR) model(s), one or more Sequence-to-Sequence (Seq2Seq) model(s), one or more large language model(s) (LLM(s)), one or more deep learning system(s), one or more classifier(s), one or more transformer(s), or a combination thereof. In examples where the ML model(s) 1625 include LLMs, the LLMs can include, for instance, a Generative Pre-Trained Transformer (GPT) (e.g., GPT-2, GPT-3, GPT-3.5, GPT-4, etc.), DaVinci or a variant thereof, an LLM using Massachusetts Institute of Technology (MIT)® langchain, Pathways Language Model (PaLM), Large Language Model Meta® AI (LLaMA), Language Model for Dialogue Applications (LaMDA), Bidirectional Encoder Representations from Transformers (BERT), Falcon (e.g., 40 B, 7 B, 1 B), Orca, Phi-1, StableLM, variant(s) of any of the previously-listed LLMs, or a combination thereof.

Within FIG. 16, a graphic representing the ML model(s) 1625 illustrates a set of circles connected to one another. Each of the circles can represent a node, a neuron, a perceptron, a layer, a portion thereof, or a combination thereof. The circles are arranged in columns. The leftmost column of white circles represent an input layer. The rightmost column of white circles represent an output layer. Two columns of shaded circled between the leftmost column of white circles and the rightmost column of white circles each represent hidden layers. An ML model can include more or fewer hidden layers than the two illustrated, but includes at least one hidden layer. In some examples, the layers and/or nodes represent interconnected filters, and information associated with the filters is shared among the different layers with each layer retaining information as the information is processed. The lines between nodes can represent node-to-node interconnections along which information is shared. The lines between nodes can also represent weights (e.g., numeric weights) between nodes, which can be tuned, updated, added, and/or removed as the ML model(s) 1625 are trained and/or updated. In some cases, certain nodes (e.g., nodes of a hidden layer) can transform the information of each input node by applying activation functions (e.g., filters) to this information, for instance applying convolutional functions, downscaling, upscaling, data transformation, and/or any other suitable functions.

In some examples, the ML model(s) 1625 can include a feed-forward network, in which case there are no feedback connections where outputs of the network are fed back into itself. In some cases, the ML model(s) 1625 can include a recurrent neural network, which can have loops that allow information to be carried across nodes while reading in input. In some cases, the network can include a convolutional neural network, which may not link every node in one layer to every other node in the next layer.

One or more input(s) 1605 can be provided to the ML model(s) 1625. The ML model(s) 1625 can be trained by the ML engine 1620 (e.g., based on training data 1660) to generate one or more output(s) 1630. In some examples, the input(s) 1605 include information 1610. The information 1610 can include, for instance, source data, event data, location data, subject data, etc., or a combination thereof.

The output(s) 1630 that ML model(s) 1625 generate by processing the input(s) 1605 (e.g., the information 1610 and/or the previous output(s) 1615) can include score(s) 1635 and/or arrangement(s) 1640. The score(s) 1635 can include, for instance, "Historocity" scores, trustworthiness scores, reliability scores, source scores, etc. The arrangement(s) 1640 can include, for instance, an estimate of an object's significance, whether the data source is trustworthy, estimated value for the property, etc. In some embodiments, the arrangement is a transferrable data asset including the score(s) 1435 and other data, such as the estimate of the object's significance, determinations to data source trustworthiness, estimated values of the property, historical information related to the property, etc. The ML model(s) 1625 can generate the score(s) 1635 based on the information 1610 and/or other types of input(s) 1605 (e.g., previous output(s) 1615). In some examples, the score(s) 1635 can be used as part of the input(s) 1605 to the ML model(s) 1625 (e.g., as part of previous output(s) 1615) for generating the arrangement(s) 1640, for identifying a further score(s) 1635, and/or for generating other output(s) 1630. In some examples, at least some of the previous output(s) 1615 in the input(s) 1605 represent previously-identified score(s) that are input into the ML model(s) 1625 to identify the score(s) 1635, the arrangement(s) 1640, and/or other output(s) 1630. In some examples, based on receipt of the input(s) 1605, the ML model(s) 1625 can select the output(s) 1630 from a list of possible outputs, for instance by ranking the list of possible outputs by likelihood, probability, and/or confidence based on the input(s) 1605. In some examples, based on receipt of the input(s) 1605, the ML model(s) 1625 can identify the output(s) 1630 at least in part using generative artificial intelligence (AI) content generation techniques, for instance using an LLM to generate custom text and/or graphics identifying the output(s) 1630.

In some examples, the ML system repeats the process illustrated in FIG. 16 multiple times to generate the output(s) 1630 in multiple passes, using some of the output(s) 1630 from earlier passes as some of the input(s) 1605 in later passes (e.g., as some of the previous output(s) 1615). For instance, in a first illustrative example, in a first pass, the ML model(s) 1625 can identify the score(s) 1635 based on input of the information 1610 into the ML model(s) 1625. In a second pass, the ML model(s) 1625 can identify the arrangement(s) 1640 based on input of the information 1610 and the previous output(s) 1615 (that includes the score(s) 1635 from the first pass) into the ML model(s) 1625.

In some examples, the ML system includes one or more feedback engine(s) 1645 that generate and/or provide feedback 1650 about the output(s) 1630. In some examples, the feedback 1650 indicates how well the output(s) 1630 align to corresponding expected output(s), how well the output(s) 1630 serve their intended purpose, or a combination thereof. In some examples, the feedback engine(s) 1645 include loss function(s), reward model(s) (e.g., other ML model(s) that are used to score the output(s) 1630), discriminator(s), error function(s) (e.g., in back-propagation), user interface feedback received via a user interface from a user, or a combination thereof. In some examples, the feedback 1650 can include one or more alignment score(s) that score a level of alignment between the output(s) 1630 and the expected output(s) and/or intended purpose.

The ML engine 1620 of the ML system can update (further train) the ML model(s) 1625 based on the feedback 1650 to perform an update 1655 (e.g., further training) of the ML model(s) 1625 based on the feedback 1650. In some examples, the feedback 1650 includes positive feedback, for instance indicating that the output(s) 1630 closely align with expected output(s) and/or that the output(s) 1630 serve their intended purpose. In some examples, the feedback 1650 includes negative feedback, for instance indicating a mismatch between the output(s) 1630 and the expected output(s), and/or that the output(s) 1630 do not serve their intended purpose. For instance, high amounts of loss and/or error (e.g., exceeding a threshold) can be interpreted as negative feedback, while low amounts of loss and/or error (e.g., less than a threshold) can be interpreted as positive feedback. Similarly, high amounts of alignment (e.g., exceeding a threshold) can be interpreted as positive feedback, while low amounts of alignment (e.g., less than a threshold) can be interpreted as negative feedback.

In response to positive feedback in the feedback 1650, the ML engine 1620 can perform the update 1655 to update the ML model(s) 1625 to strengthen and/or reinforce weights (and/or connections and/or hyperparameters) associated with generation of the output(s) 1630 to encourage the ML engine 1620 to generate similar output(s) 1630 given similar input(s) 1605. In this way, the update 1655 can improve the ML model(s) 1625 itself by improving the accuracy of the ML model(s) 1625 in generating output(s) 1630 that are similarly accurate given similar input(s) 1605. In response to negative feedback in the feedback 1650, the ML engine 1620 can perform the update 1655 to update the ML model(s) 1625 to weaken and/or remove weights (and/or connections and/or hyperparameters) associated with generation of the output(s) 1630 to discourage the ML engine 1620 from generating similar output(s) 1630 given similar input(s) 1605. In this way, the update 1655 can improve the ML model(s) 1625 itself by improving the accuracy of the ML model(s) 1625 in generating output(s) 1630 are more accurate given similar input(s) 1605. In some examples, for instance, the update 1655 can improve the accuracy of the ML model(s) 1625 in generating output(s) 1630 by reducing false positive(s) and/or false negative(s) in the output(s) 1630.

For instance, here, if the score(s) 1635 and/or arrangement(s) 1640 are corroborated, the corroboration can be interpreted as feedback 1650 that is positive (e.g., positive feedback). For instance, here, if the score(s) 1635 and/or arrangement(s) 1640 are inconsistent with other records, the inconsistency can be interpreted as feedback 1650 that is negative (e.g., negative feedback). Either way, the update 1655 can improve the ML system 1600 and the overall system by improving the consistency with which the corroboration or verification is successful.

In some examples, the ML engine 1620 can also perform an initial training of the ML model(s) 1625 before the ML model(s) 1625 are used to generate the output(s) 1630 based on the input(s) 1605. During the initial training, the ML engine 1620 can train the ML model(s) 1625 based on training data 1660. In some examples, the training data 1660 includes examples of input(s) (of any input types discussed with respect to the input(s) 1605), output(s) (of any output types discussed with respect to the output(s) 1630), and/or feedback (of any feedback types discussed with respect to the feedback 1650). In some cases, positive feedback in the training data 1660 can be used to perform positive training, to encourage the ML model(s) 1625 to generate output(s) similar to the output(s) in the training data given input of the corresponding input(s) in the training data. In some cases, negative feedback in the training data 1660 can be used to perform negative training, to discourage the ML model(s) 1625 from generate output(s) similar to the output(s) in the training data given input of the corresponding input(s) in the training data. In some examples, the training of the ML model(s) 1625 (e.g., the initial training with the training data 1660, update(s) 1655 based on the feedback 1650, and/or other modification(s)) can include fine-tuning of the ML model(s) 1625, retraining of the ML model(s) 1625, or a combination thereof.

In some examples, the ML model(s) 1625 can include an ensemble of multiple ML models, and the ML engine 1620 can curate and manage the ML model(s) 1625 in the ensemble. The ensemble can include ML model(s) 1625 that are different from one another to produce different respective outputs, which the ML engine 1620 can average (e.g., mean, median, and/or mode) to identify the output(s) 1630. In some examples, the ML engine 1620 can calculate the standard deviation of the respective outputs of the different ML model(s) 1625 in the ensemble to identify a level of confidence in the output(s) 1630. In some examples, the standard deviation can have an inverse relationship with confidence. For instance, if the respective outputs of the different ML model(s) 1625 are very different from one another (and thus have a high standard deviation above a threshold), the confidence that the output(s) 1630 are accurate may be low (e.g., below a threshold). On the other hand, if the respective outputs of the different ML model(s) 1625 are equal or very similar to one another (and thus have a low standard deviation below a threshold), the confidence that the output(s) 1630 are accurate may be high (e.g., above a threshold). In some examples, different ML models(s) 1625 in the ensemble can include different types of models. For instance, in some examples, an ensemble can include a NN and a SVM that are both trained to process the input(s) 1605 to generate at least a subset of the output(s) 1630. In some examples, the ensemble may include different ML model(s) 1625 that are trained to process different inputs of the input(s) 1605 and/or to generate different outputs of the output(s) 1630. For instance, in some examples, a first model (or set of models) can process the input(s) 1605 to generate the score(s) 1635, while a second model (or set of models) can process the input(s) 1605 to generate the arrangement(s) 1640. In some examples, the ML engine 1620 can choose specific ML model(s) 1625 to be included in the ensemble because the chosen ML model(s) 1625 are effective at accurately processing particular types of input(s) 1605, are effective at accurately generating particular types of output(s) 1630, are generally accurate, process input(s) 1605 quickly, generate output(s) 1630 quickly, are computationally efficient, have higher or lower degrees of uncertainty than other models in the ensemble, or a combination thereof.

In some examples, one or more of the ML model(s) 1625 can be initialized with weights, connections, and/or hyperparameters that are selected randomly. This can be referred to as random initialization. These weights, connections, and/or hyperparameters are modified over time through training (e.g., initial training with the training data 1660 and/or update(s) 1655 based on the feedback 1650), but the random initialization can still influence the way the ML model(s) 1625 process data, and thus can still cause different ML model(s) 1625 (with different random initializations) to produce different output(s) 1630. Thus, in some examples, different ML model(s) 1625 in an ensemble can have different random initializations.

As an ML model (of the ML model(s) 1625) is trained (e.g., along the initial training with the training data 1660, update(s) 1655 based on the feedback 1650, and/or other modification(s)), different versions of the ML model at different stages of training can be referred to as checkpoints. In some examples, after each new update to a model (e.g., update 1655) generates a new checkpoint for the model, the ML engine 1620 tests the new checkpoint (e.g., against testing data and/or validation data where the correct output(s) are known) to identify whether the new checkpoint improves over older checkpoints or not, and/or if the new checkpoint introduces new errors (e.g., false positive(s) and/or false negative(s)). This testing can be referred to as checkpoint benchmark scoring. In some examples, in checkpoint benchmark scoring, the ML engine 1620 produces a benchmark score for one or more checkpoint(s) of one or more ML model(s) 1625, and keeps the checkpoint(s) that have the best (e.g., highest or lowest) benchmark scores in the ensemble. In some examples, if a new checkpoint is worse than an older checkpoint, the ML engine 1620 can revert to the older checkpoint. The benchmark score for a can represent a level of accuracy of the checkpoint and/or number of errors (e.g., false positive or false negative) by the checkpoint during the testing (e.g., against the testing data and/or the validation data). In some examples, an ensemble of the ML model(s) 1625 can include multiple checkpoints of the same ML model.

In some examples, the ML model(s) 1625 can be modified, either through the initial training (with the training data 1660), an update 1655 based on the feedback 1650, or another modification to introduce randomness, variability, and/or uncertainty into an ensemble of the ML model(s) 1625. In some examples, such modification(s) to the ML model(s) 1625 can include dropout (e.g., Monte Carlo dropout), in which one or more weights or connections are selected at random and removed. In some examples, dropout can also be performed during inference, for instance to modify the output(s) 1630 generated by the ML model(s) 1625. The term Bayesian Machine Learning (BML) can refer to random dropout, random initialization, and/or other randomization-based modifications to the ML model(s) 1625. In some examples, the modification(s) to the ML model(s) 1625 can include a hyperparameter search and/or adjustment of hyperparameters. The hyperparameter search can involve training and/or updating different ML model(s) 1625 with different values for hyperparameters and evaluating the relative performance of the ML model(s) 1625 (e.g., against (e.g., against testing data and/or validation data where the correct output(s) are known) to identify which of the ML model(s) 1625 performs best. Hyperparameters can include, for instance, temperature (e.g., influencing level creativity and/or randomness), top P (e.g., influencing level creativity and/or randomness), frequency penalty (e.g., to prevent repetitive language between one of the output(s) 1630 and another), presence penalty (e.g., to encourage the ML model(s) 1625 to introduce new data in the output(s) 1630), other parameters or settings, or a combination thereof.

In some examples, the ML engine 1620 can perform retrieval-augmented generation (RAG) using the model(s) 1625. For instance, in some examples, the ML engine 1620 can pre-process the input(s) 1605 by retrieving additional information from one or more data store(s) (e.g., any of the databases and/or other data structures discussed herein) and using the additional information to enhance the input(s) 1605 before the input(s) 1605 are processed by the ML model(s) 1625 to generate the output(s) 1630. For instance, in some examples, the enhanced versions of the input(s) 1605 can include the additional information that the ML engine 1620 retrieved from the from one or more data store(s). In some examples, this RAG process provides the ML model(s) 1625 with more relevant information, allowing the ML model(s) 1625 to generate more accurate and/or personalized output(s) 1630.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A method for generating a virtual memorial interface, the method comprising:

storing a plurality of subject structured identity datasets in at least one database in memory, wherein the plurality of structured identity datasets corresponds to one or more perspective categories relating to one or more subjects;

detecting sensor data indicating that a user device associated with a first one of the perspective categories relating to one of the subjects meets a memorial parameter associated with the subject, the memorial parameter defining a threshold proximity to a specified location;

filtering data from the at least one database to retrieve one or more of the plurality of structured identity datasets associated with the subject;

selecting a subset of data from the filtered structured identity datasets based on perspective parameters corresponding to the first perspective category associated with the user device; and outputting a virtual memorial regarding the subject through an interactive user interface accessible to the user device, wherein the virtual memorial includes an aggregation of the selected subset of data arranged in accordance with a timeline.

2. The method of claim 1, wherein the one or more of the plurality of structured identity datasets include data corresponding to a plurality of aspects associated with the subject, the plurality of aspects including at least one of a person, an object, a place, or an event.

3. The method of claim 1, wherein the virtual memorial includes a visualization of the selected subset of data plotted along at least one axis.

4. The method of claim 1, wherein the subject is one of a person, an event, or a place.

5. The method of claim 1, wherein the plurality of structured identity datasets includes audio data and visual data.

6. The method of claim 1, further comprising identifying, based on a temporal condition associated with the virtual memorial, that the temporal condition is met, wherein outputting of the virtual memorial is based on the temporal condition being met.

7. The method of claim 6, wherein identifying that the temporal condition is met includes identifying that a time of access of the user device falls within a predefined time interval during which the virtual memorial is accessible.

8. A system for generating a virtual memorial interface, the system comprising:

a memory storing instructions; and a processor, wherein execution of the instructions by the processor causes the processor to:

store a plurality of structured identity datasets in at least one database in the memory, wherein the plurality of structured identity datasets corresponds to one or more perspective categories relating to one or more subjects;

detect sensor data indicating that a user device associated with a first one of the perspective categories relating to one of the subjects meets a memorial parameter associated with the subject, the memorial parameter defining a threshold proximity to a specified location;

filter data from the at least one database to retrieve one or more of the plurality of structured identity datasets associated with the time period and the second perspective-subject;

select a subset of data from the filtered structured identity datasets based on perspective parameters corresponding to the first perspective category associated with the user device; and output a virtual memorial regarding the subject through an interactive user interface accessible to the user device, wherein the virtual memorial includes an aggregation of the selected subset of data arranged in accordance with a timeline.

9. The system of claim 8, wherein the one or more of the plurality of structured identity datasets include data corresponding to a plurality of aspects associated with the subject, the plurality of aspects including at least one of a person, an object, a place, or an event.

10. The system of claim 8, wherein the virtual memorial includes a visualization of the selected subset of data plotted along at least one axis.

11. The system of claim 8, wherein the subject is one of a person, an event, or a place.

12. The system of claim 8, wherein the plurality of structured identity datasets includes audio data and visual data.

13. The system of claim 8, wherein the execution of the instructions by the processor causes the processor to identify, based on a temporal condition associated with the virtual memorial, that the temporal condition is met, wherein outputting of the virtual memorial is based on the temporal condition being met.

14. The system of claim 13, wherein identifying that the temporal condition is met includes identifying that a time of access of the user device falls within a predefined time interval during which the virtual memorial is accessible.

15. A non-transitory computer-readable storage medium, having embodied thereon a program executable by a processor to perform a method for generating a virtual memorial interface, the method comprising:

storing a plurality of structured identity datasets in at least one database in memory, wherein the plurality of structured identity datasets corresponds to one or more perspective categories relating to one or more subjects;

detecting sensor data indicating that a user device associated with a first one of the perspective categories relating to one of the subjects meets a memorial parameter associated with the subject, the memorial parameter defining a threshold proximity to a specified location;

filtering data from the at least one database to retrieve one or more of the plurality of structured identity datasets associated with the subject;

selecting a subset of data from the filtered structured identity datasets based on perspective parameters corresponding to the first perspective category associated with the user device; and outputting a virtual memorial regarding the subject through an interactive user interface accessible to the user device, wherein the virtual memorial includes an aggregation of the selected subset of data arranged in accordance with a timeline.

16. The non-transitory computer-readable storage medium of claim 15, further comprising identifying, based on a temporal condition associated with the virtual memorial, that the temporal condition is met, wherein outputting of the virtual memorial is based on the temporal condition being met.

17. The method of claim 1, further comprising updating the virtual memorial based on a change to the plurality of structured identity datasets in the at least one database.

18. The method of claim 1, wherein the one or more perspective categories include the first perspective category corresponding to a first group that includes a first person, and a second perspective category corresponding to a second group that includes a second person.

19. The method of claim 1, wherein the subset of data selected based on the perspective parameters corresponding to the first perspective category is different from a subset of data selected based on perspective parameters corresponding to a perspective category that is different from the first perspective category.

20. The method of claim 1, wherein the subset of data from the filtered structured identity datasets includes data associated with respective data sources having data source reliability scores, wherein the data source reliability scores indicate relative reliability of the respective data sources.

* * * * *